Nov. 14, 1967   W. J. HILL   3,352,228
COIL COMPACTING AND STRAPPING APPARATUS
Filed May 6, 1964   16 Sheets-Sheet 2
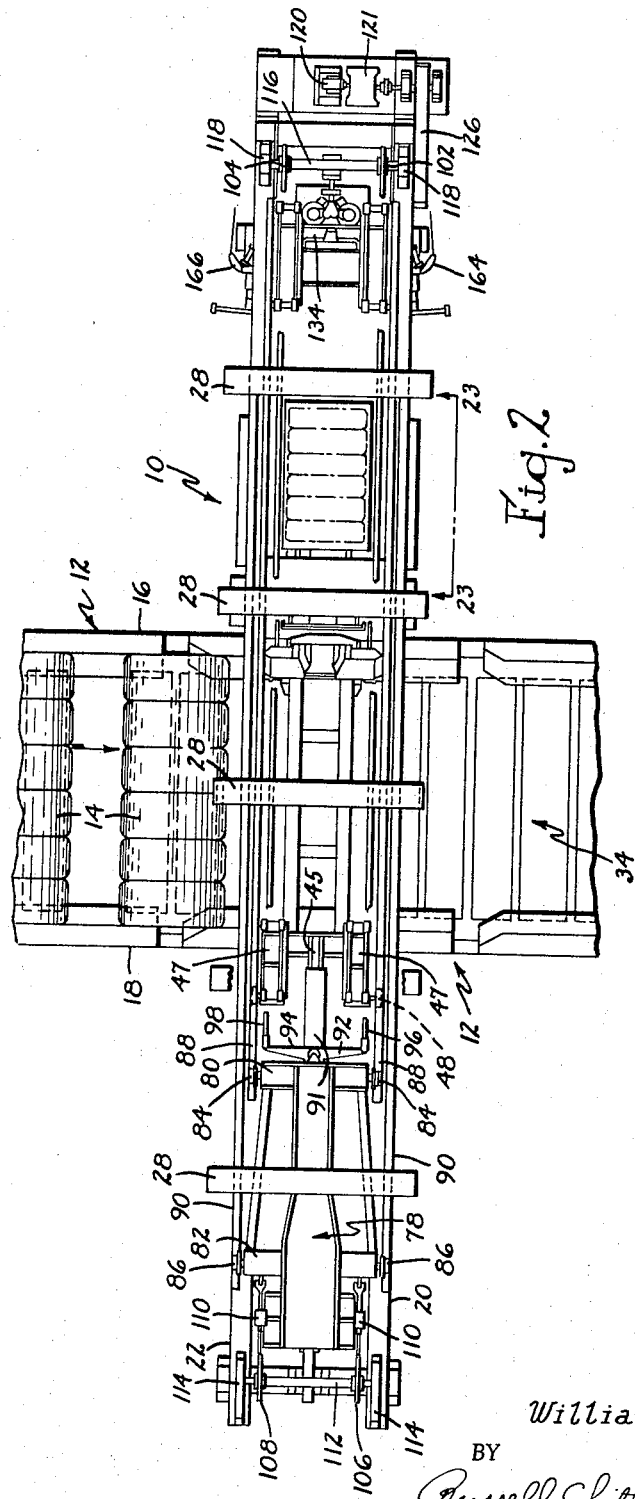
INVENTOR.
William J. Hill
BY
Russell, Chittick & Pfund
Attorneys

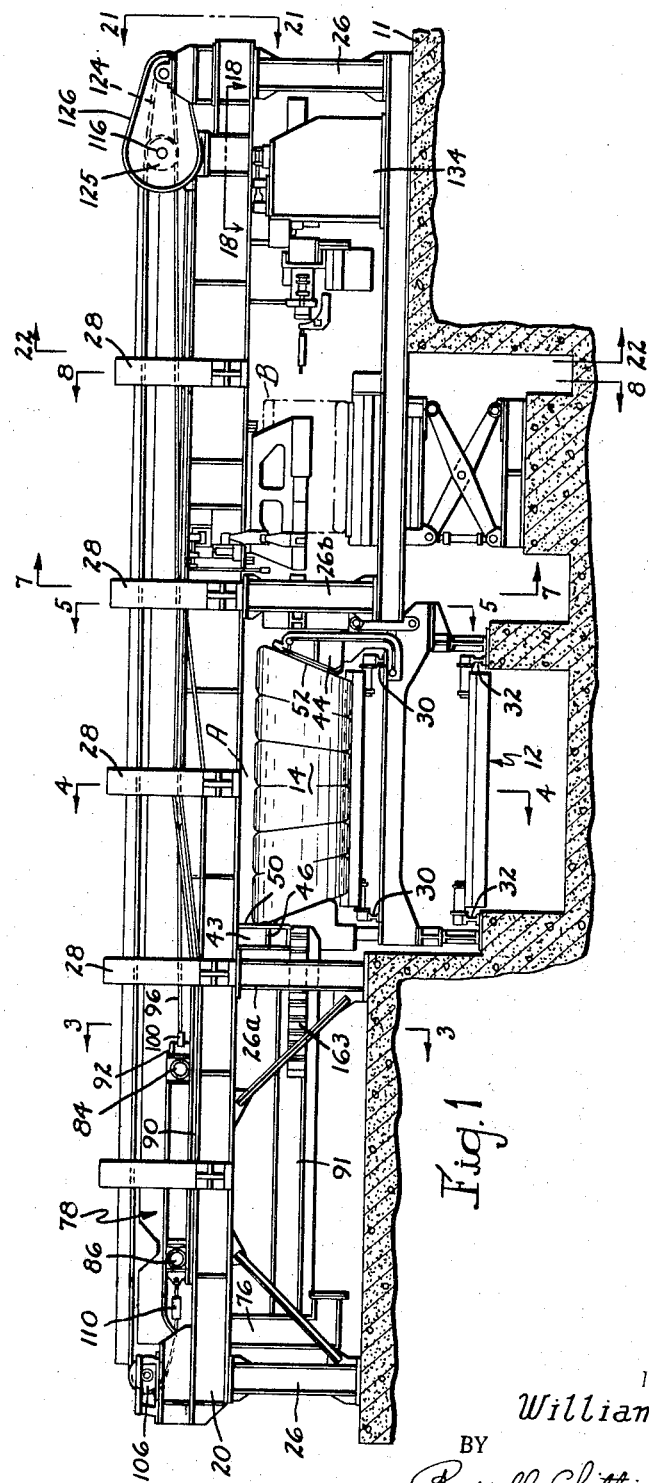

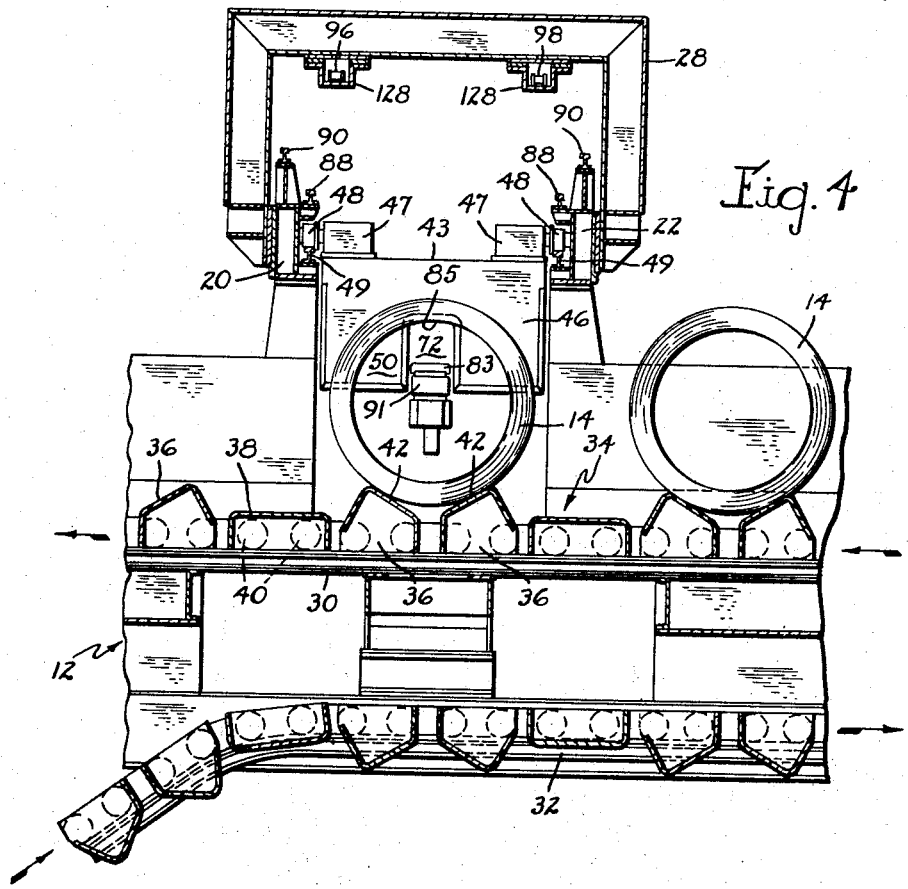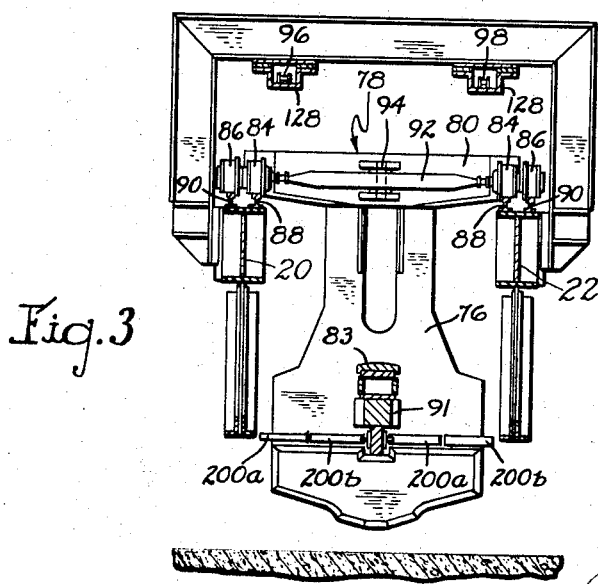

Nov. 14, 1967  W. J. HILL  3,352,228
COIL COMPACTING AND STRAPPING APPARATUS
Filed May 6, 1964  16 Sheets-Sheet 4
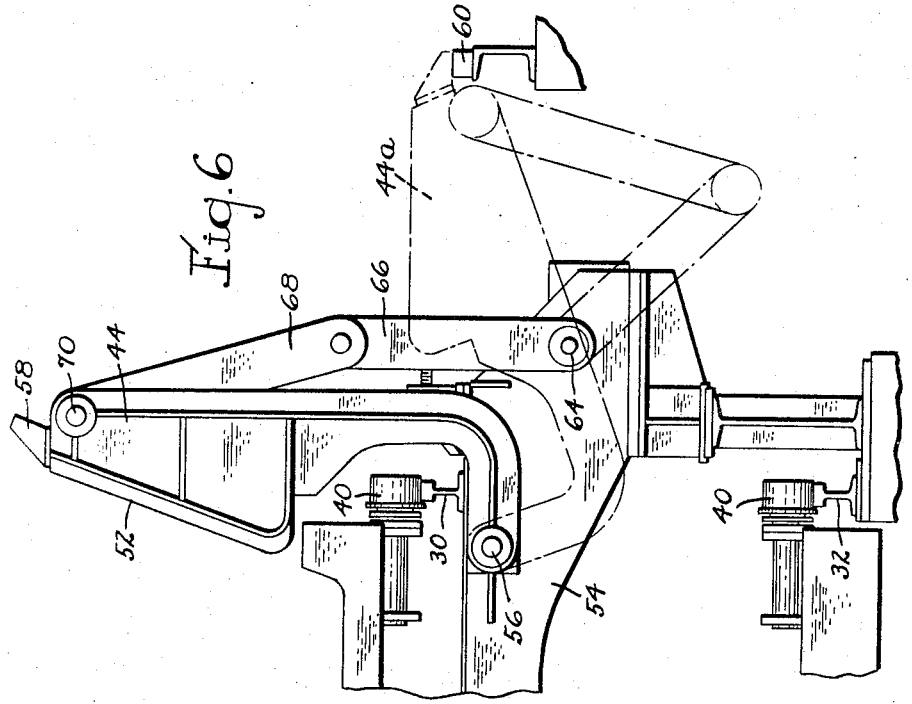
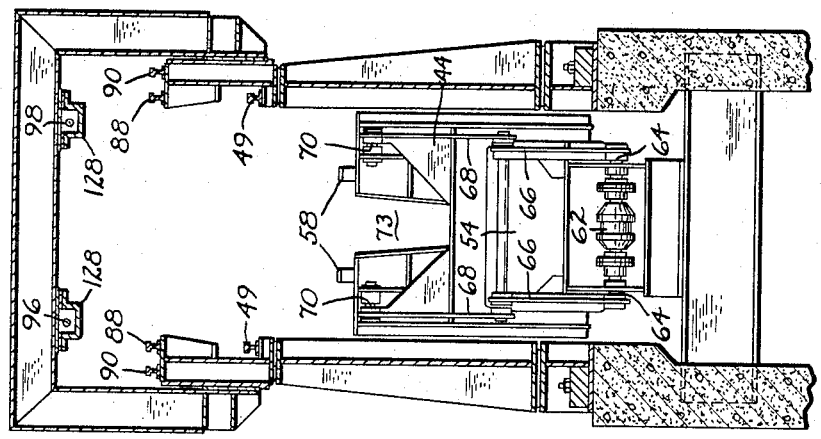
INVENTOR.
William J. Hill
BY
Russell, Chittick & Pfund
Attorneys Nov. 14, 1967  W. J. HILL  3,352,228
COIL COMPACTING AND STRAPPING APPARATUS
Filed May 6, 1964  16 Sheets-Sheet 6

INVENTOR.
William J. Hill
BY
Russell, Chittick & Pfund
Attorneys

Nov. 14, 1967  W. J. HILL  3,352,228
COIL COMPACTING AND STRAPPING APPARATUS
Filed May 6, 1964  16 Sheets-Sheet 9

INVENTOR.
William J. Hill
BY
Russell, Chittick & Pfund
Attorneys

Nov. 14, 1967 W. J. HILL 3,352,228
COIL COMPACTING AND STRAPPING APPARATUS
Filed May 6, 1964 16 Sheets-Sheet 10

INVENTOR.
William J. Hill
BY
Russell, Chittick & Pfund
Attorneys

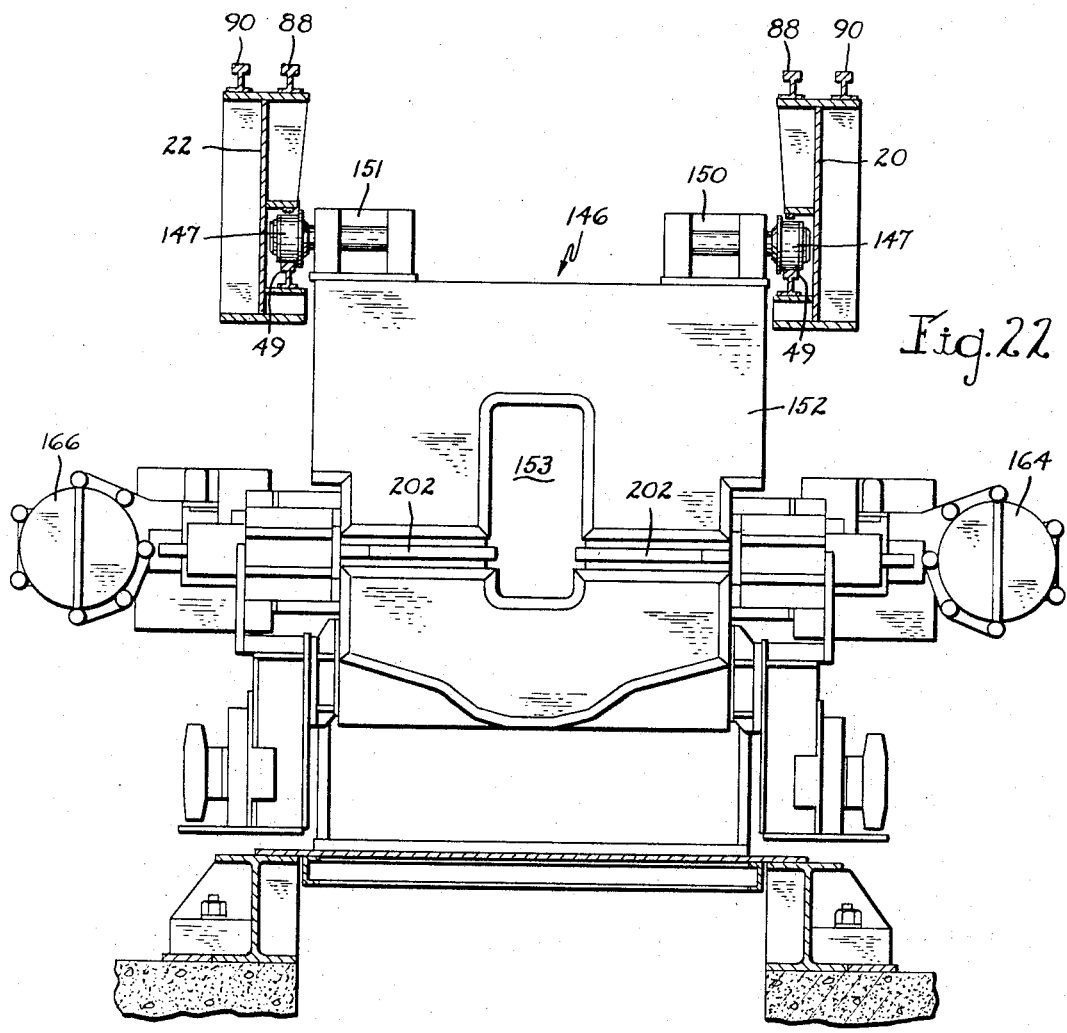

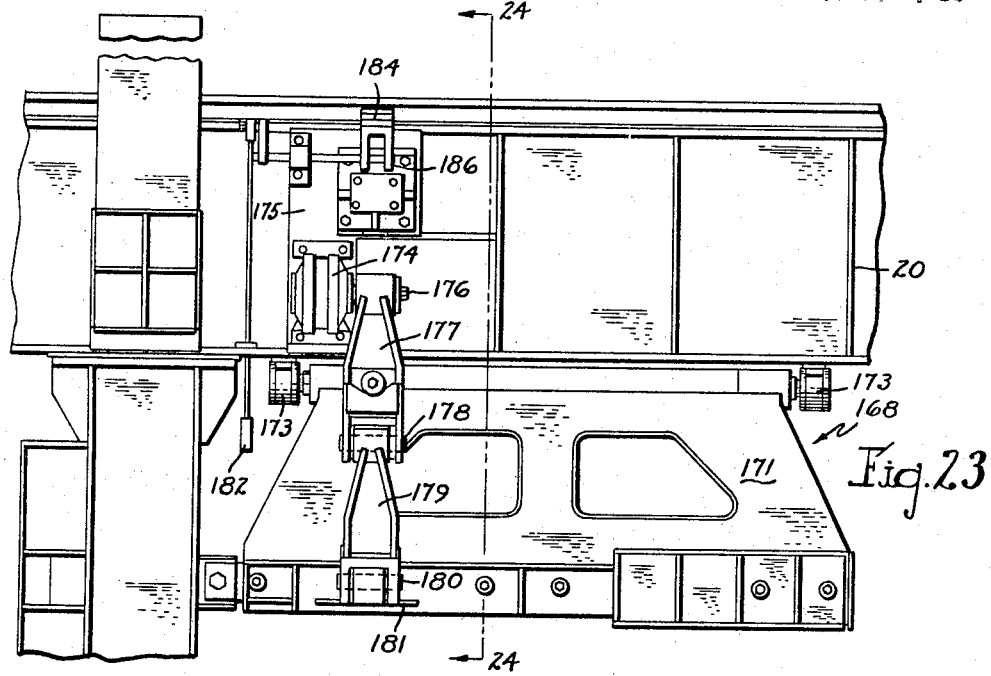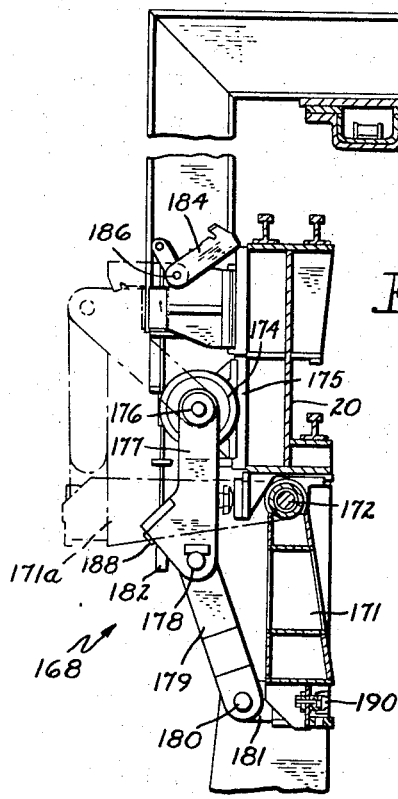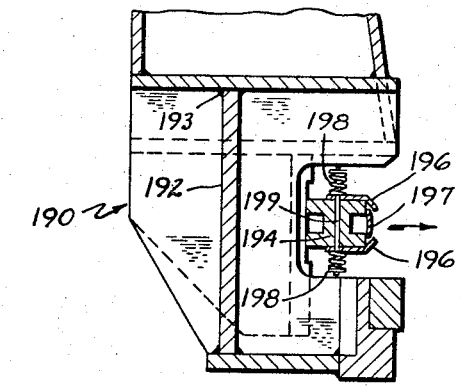

Nov. 14, 1967   W. J. HILL   3,352,228
COIL COMPACTING AND STRAPPING APPARATUS
Filed May 6, 1964   16 Sheets-Sheet 13
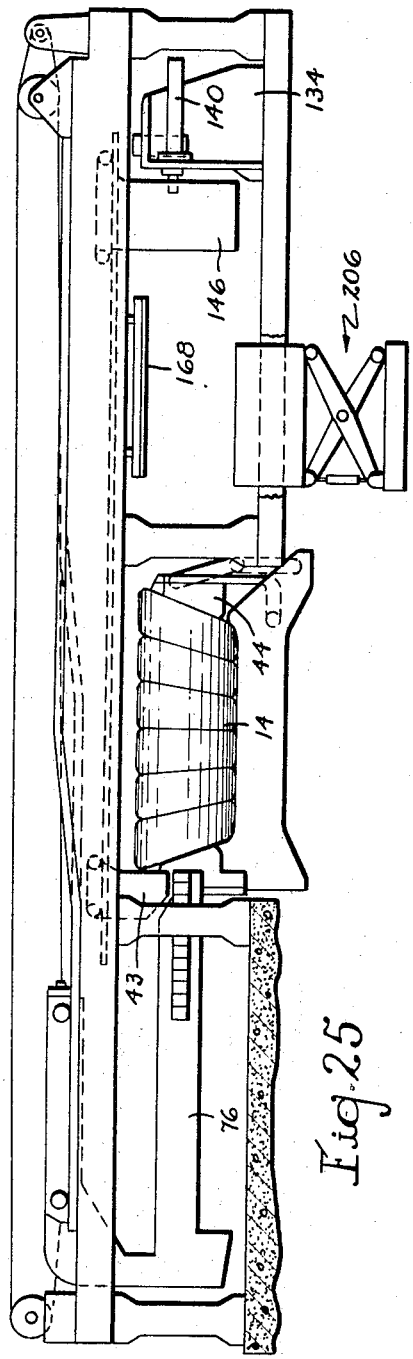
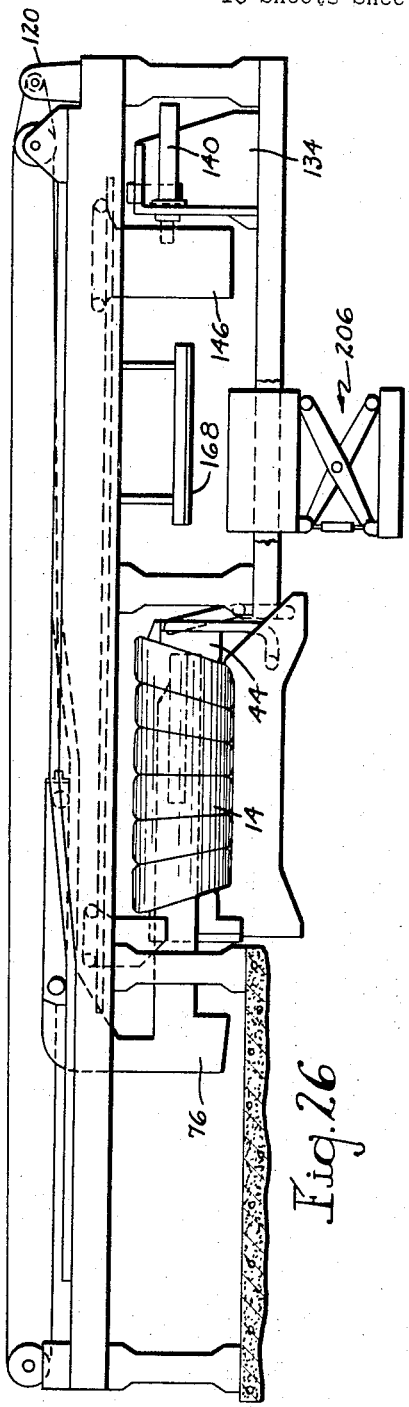
INVENTOR.
William J. Hill
BY
Russell, Chittick & Pfund
Attorneys Nov. 14, 1967 W. J. HILL 3,352,228
COIL COMPACTING AND STRAPPING APPARATUS
Filed May 6, 1964 16 Sheets-Sheet 14
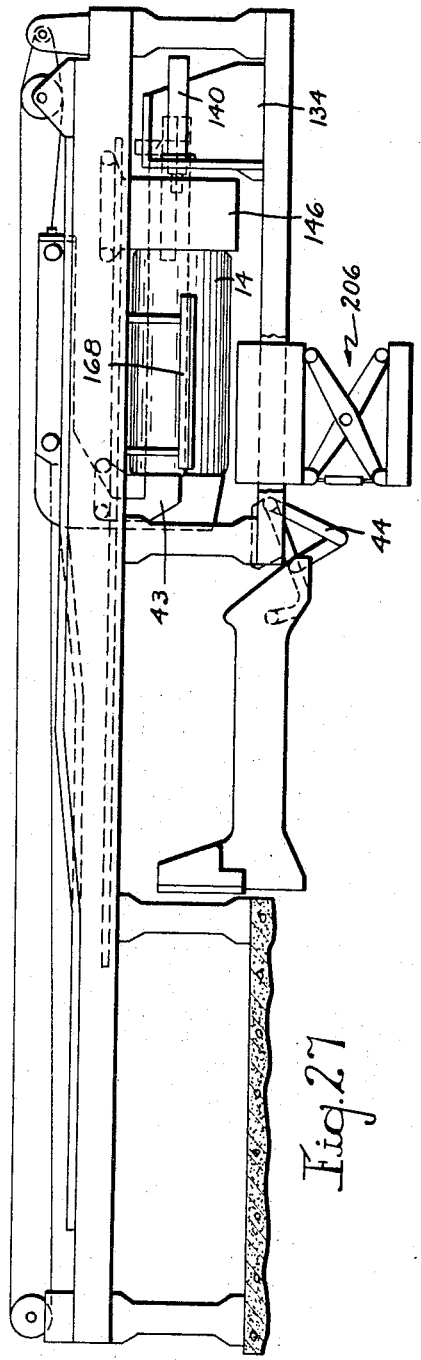
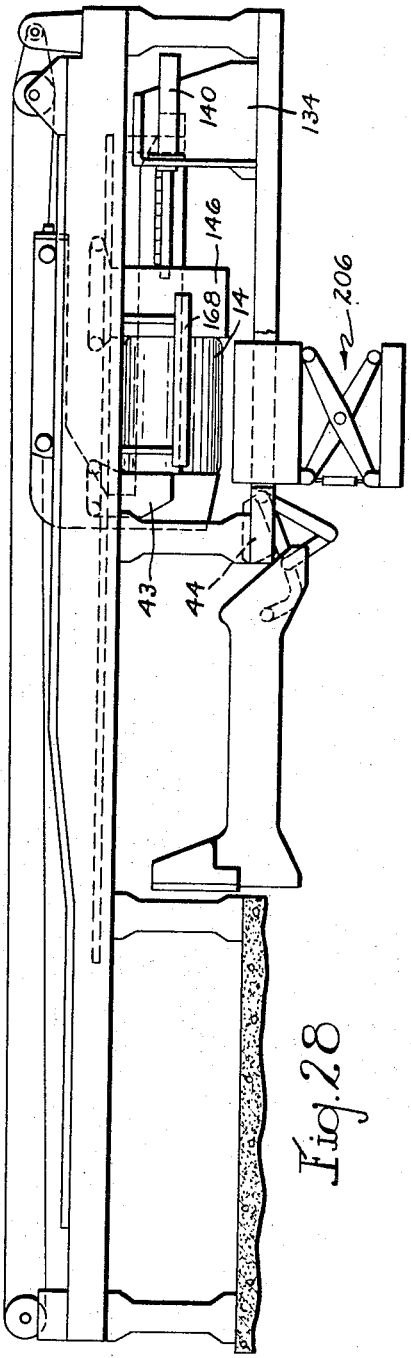
INVENTOR.
William J. Hill
BY
Russell, Chittick & Pfund
Attorneys Nov. 14, 1967  W. J. HILL  3,352,228
COIL COMPACTING AND STRAPPING APPARATUS
Filed May 6, 1964  16 Sheets-Sheet 15
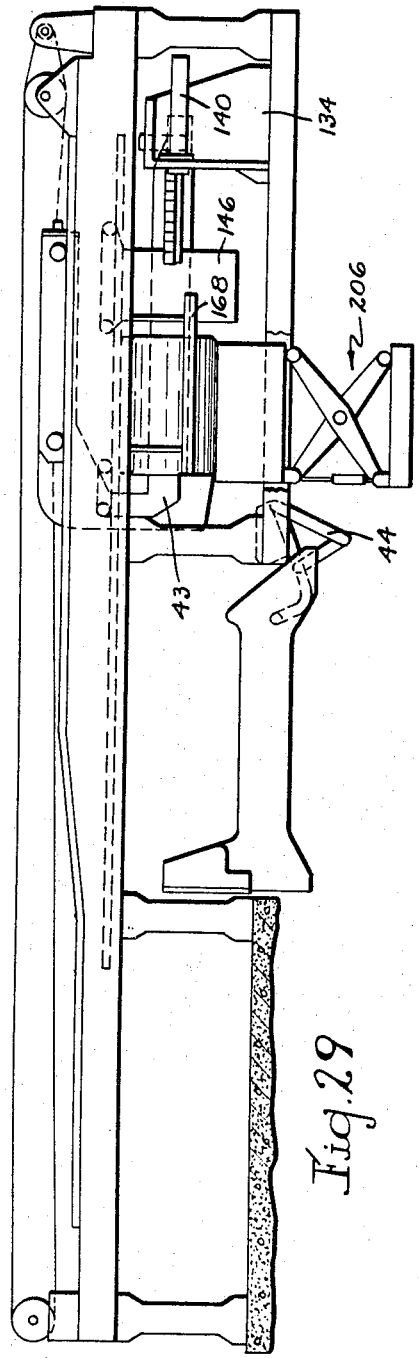
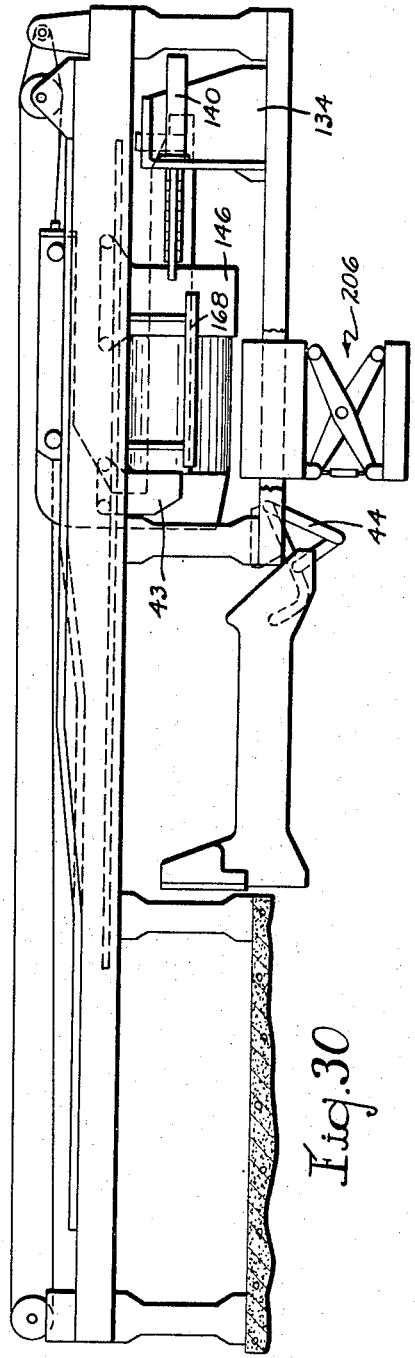
INVENTOR.
William J. Hill
BY
Russell, Chittick & Pfund
Attorneys

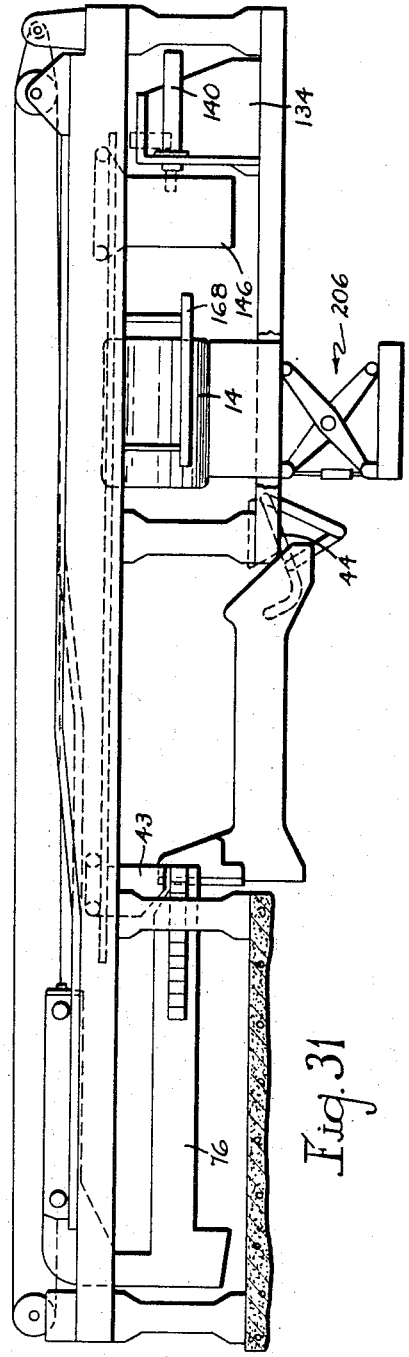
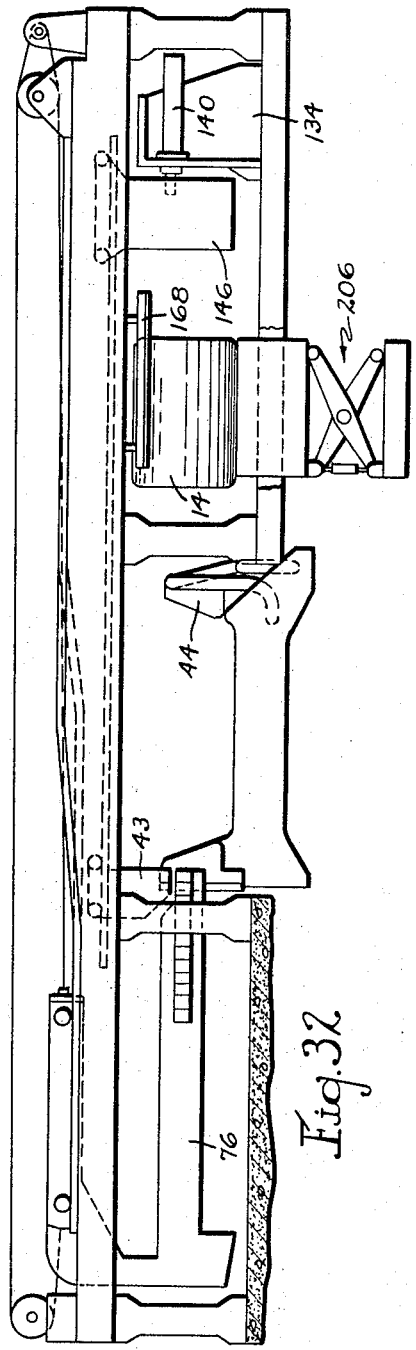

United States Patent Office 3,352,228
Patented Nov. 14, 1967

3,352,228
COIL COMPACTING AND STRAPPING
APPARATUS
William J. Hill, Holden, Mass., assignor to Morgan Construction Co., Worcester, Mass., a corporation of Massachusetts
Filed May 6, 1964, Ser. No. 365,289
14 Claims. (Cl. 100—12)

This invention relates to rolling mills and more particularly to coil handling apparatus for automatically compacting and strapping individual rod coils into unitized damage resistant bundles.

Under normal operating conditions, rod emerges from a rod mill in long continuous lengths with the total weight of each length being approximately equal to that of individual billets initially introduced at the roughing stands. Upon leaving the final finishing stand, each rod length is gathered into coils by coiling apparatus such as pouring or laying reels for subsequent storage and shipment to customers. Where the total weight of an individual rod length is in excess of the desired coil weight, shearing means are usually provided in advance of the coiling apparatus for dividing each rod into properly weighted portions.

Upon completion of the coiling operation, the individual rod coils are removed from the reels onto an intermediate conveyor and subsequently upended to effect loading on a continuous hook carrier system. The coils are then transported by a hook carrier system to a remote storage area where they are axially deposited on the floor in rows leaning one against the other. Thus it can be seen that individual coils are usually stored and subsequently shipped without being bundled.

Although the above-described procedure has been widely practiced in the industry, experience has shown that when handled in the aforementioned manner, the individual coils tend to occupy an unnecessarily large amount of valuable storage and shipping space. Moreover, the loosely packed individual coils frequently become distorted and damaged by rough handling during storage and shipping. It has therefore been found desirable to assemble groups of individual coils into tightly compressed damage-resistant bundles. In this manner, the coils will occupy less storage and shipping space, thereby providing the rod producer with an important cost saving. In addition, the tightly compressed bundles will provide improved rigid structures with a greater resistance to distortion and damage.

Although various types of apparatus have been developed in the past for collecting and compacting individual rod coils into unitized bundles, their use has proved only moderately successful. For example, in a device presently in use, the individual coils are axially deposited on a supporting or loading arm extending horizontally from a mobile truck base. The truck is then advanced towards a stationary stanchion having an arm receiving passageway extending therethrough. Following the insertion of the arm within the passageway, the forward movement of the truck is accelerated. The mass and forward acceleration of the truck combine to produce a compressive force tending to compact the coils against the stanchion. When the truck wheels begin to slip on the mill floor, maximum compressive force has been attained and the truck's brakes are applied. The compressed coils are thereafter manually strapped by The disadvantages inherent in the aforementioned procedure are readily apparent. The production of coil bundles having uniform lengths is impossible due to the inability of the truck operator to control to any constant degree the compressive force being exerted on each succeeding group of coils. This in turn creates storage and shipping difficulties due to the resulting variation in axial length of the bundles. In addition, the maximum compressive force capable of being exerted on the individual coils is to a great degree limited by the traction capable of being developed by the truck wheels on the mill floor. A still further disadvantage inherent in this type of apparatus is to be found in the manual strapping operation which requires the services of at least two operating personnel in addition to the truck operator.

Other types of coil compacting apparatus presently in use operate on a vertical press principal. The coils are axially deposited on a vertically disposed mandrel and thereafter downwardly compressed by a conventional hydraulic press arrangement. Although a greater compressive force can be exerted with this type of apparatus, difficulties have been encountered in providing satisfactory axial coil alignment prior to compaction. Where the axial alignment of the coils is improper, distorted bundles are often produced.

These and other difficulties experienced with the prior art devices have now been obviated in a novel manner by the present invention, an object of which is to provide an improved apparatus for automatically axially aligning, compacting and strapping individual coils into unitized damage resistant bundles.

Another object of the present invention is to provide an apparatus capable of producing tightly compacted bundles having a constant axial length for a given number of coils.

Another object of the present invention is to provide a compacting and strapping apparatus capable of being quickly adjusted to produce bundles of varying axial lengths, depending on the number of coils contained therein.

A further object of the present invention is to provide an apparatus capable of constantly exerting the desired maximum compressive force on the coils in order to achieve maximum compaction.

Another object of the present invention is to provide an apparatus having greater structural strength and rigidity.

Another object of the present invention is to provide accurate and continuous axial coil alignment during the entire compacting and strapping cycle.

Another object of the present invention is to provide an apparatus capable of automatically strapping the compacted coils at 90° intervals in order to provide a tighter and more uniform bundle.

A further object of the present invention is to provide an apparatus capable of strapping the compacted coils at a point when the maximum compacting force is being axially exerted thereon, thereby insuring the production of tight damage resistant bundles.

With these and other objects in view it will be apparent to those skilled in the art that the invention resides in the combination of parts set forth in the specification and covered by the claims appended hereto. The character of the invention, however, may be best understood by reference to the accompanying drawings in which:

FIG. 1 is a view of the compacting and strapping apparatus according to the present invention in side elevation looking upstream of the coil conveyor;

FIG. 2 is a plan view of the compacting and strapping apparatus as shown in FIG. 1;

FIG. 3 is an enlarged sectional view taken along line 3—3 of FIG. 1;

FIG. 4 is an enlarged sectional view taken along line 4—4 of FIG. 1;

FIG. 5 is an enlarged sectional view taken along line 5—5 of FIG. 1;

FIG. 6 is an enlarged view in side elevation of the tilting fence;

FIG. 22 is an enlarged sectional view taken along line 22—22 of FIG. 1;

FIG. 23 is an enlarged side elevation of one of the swinging strap tracks taken along line 23—23 of FIG. 2.

FIG. 24 is a sectional view of a swinging strap track taken along line 24—24 of FIG. 23;

FIG. 25 is a diagrammatic sketch in side elevation of the compacting and strapping apparatus showing a plurality of coils loosely contained in axial alignment at the coil receiving station with the carrier beam and compacting gate fully withdrawn prior to commencement of the compacting cycle;

FIG. 26 is a view similar to FIG. 25 showing the carrier beam partially advanced with its lower extension axially inserted through the coils supported at the receiving station and the swinging strap tracks lowered;

FIG. 27 is a view similar to FIG. 26 showing the tilting fence pivoted to its downwardly disposed position and the carrier beam engaged by the beam grips at the compacting and strapping station;

FIG. 28 is a view similar to FIG. 27 showing the compacting cylinders and compacting gate fully extended in order to fully compact the coils axially supported on the lower extension of the carrier beam;

FIG. 29 is a view similar to FIG. 28 showing the compacting gate partially withdrawn and the coil elevator in a fully raised position in order to rotate the partially strapped bundle 90°;

FIG. 30 is a view similar to FIG. 29 showing the coil elevator partially lowered and the compacting cylinders extended in order to recompact the coils prior to the second strapping cycle;

FIG. 31 is a view similar to FIG. 30 showing the coil elevator fully raised, the compacting cylinders retracted and the carrier beam and rear gate withdrawn;

FIG. 32 is a view similar to FIG. 31 showing the strap tracks lifted for bundle clearance and the elevator lowered to discharge the compacted bundle.

FIG. 34 is a sectional view taken through a typical strap track.

Figure 7:
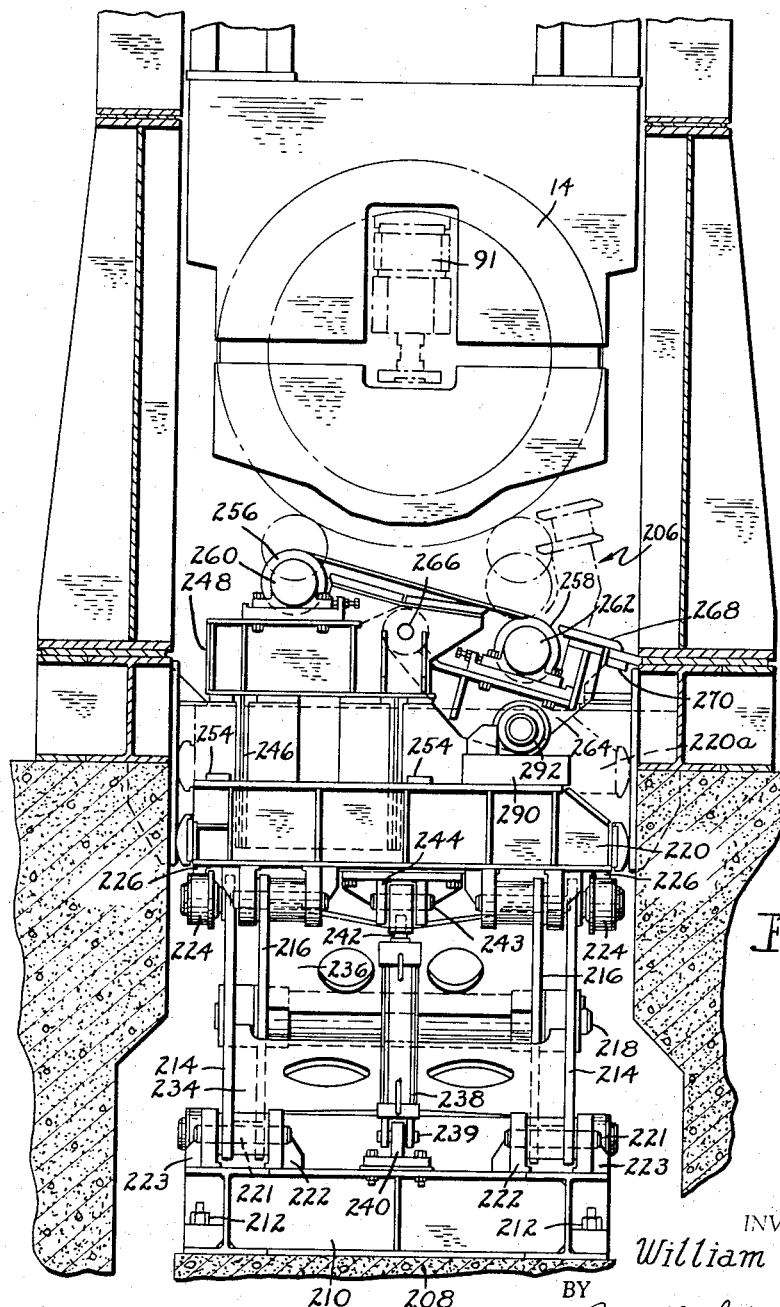
FIG. 7 is an enlarged sectional view taken along line 7—7 of FIG. 1 showing the coil elevator in its lowered position.

Referring initially to FIGS. 1 and 2, a coil compacting and strapping apparatus according to the present invention generally indicated at 10 is shown mounted on the mill floor 11 with a continuous coil conveyor indicated generally at 12 extending transversally therethrough approximately at its midsection. Conveyor 12 extends from a remote coil loading station (not shown) with its longitudinal axis extending transversally to that of the compacting and strapping apparatus 10. Individual coils of wire rod indicated typically at 14 are removed from a hook conveyor system by unloading apparatus (not shown) and deposited in approximate axial alignment on the separate flights of conveyor 12. When a conveyor flight has been loaded, the conveyor is advanced towards the coil compacting and strapping apparatus. During this movement, the individual coils are axially contained and prevented from spreading or "brooming out" by the upwardly disposed conveyor side fences indicated typically at 16 and 18.

Having thus generally described the movement of individual coils from the remotely positioned loading station to the compacting and strapping apparatus 10, the description will now proceed with particular emphasis on the structural components of the invention. The basic frame structure of compacting and strapping 10 is comprised of two spaced parallel girders 20 and 22 supported in spaced relationship above the mill floor 11 by a plurality of vertically disposed columns collectively referred to by the reference numeral 26. Girders 20 and 22 are additionally braced and held in accurate longitudinal alignment by a plurality of transversely disposed inverted U-shaped arches indicated typically at 28. With this construction, it becomes evident that the coil compacting and strapping apparatus is provided with a rigid basic frame structure capable of supporting substantial dynamic loads.

As shown in FIG. 1, the discharge end of coil conveyor 12 extending through the coil compacting and strapping apparatus 10 approximately at its midsection is straddled by vertical columns 26a and 26b. For convenience of reference, this point of intersection between the coil conveyor and the compacting and strapping apparatus will hereinafter be referred to as the "coil receiving station" and will be indicated in the drawings by the letter A. Similarly the portion of the apparatus generally arranged to the right of the coil receiving station as shown in the drawings will hereinafter be referred to as the "compacting and strapping station," and will be designated by the letter B.

Referring now to FIGS. 1, 2 and 4, the individual components which comprise coil receiving station A will now be described in connection with a more detailed description of the conveyor. Conveyor 12, extending transversely through the compacting and strapping apparatus 10 with its direction of movement as indicated in the drawings is of a conventional design with a basic frame structure comprised of upper and lower spaced guide rails 30 and 32. The upper rails 30 are supported by a suitable frame structure at a level approximating that of the mill floor 11. The lower rails 32 extend beneath the upper rails and are supported by concrete abutments forming a part of the mill foundation.

The continuous conveyor belt generally indicated by the reference numeral 34 is comprised of a series of interconnected coil supporting links 36 and intermediate links 38. Two coil supporting links 36 are positioned side by side to form a conveyor flight, each flight being spaced by an intermediate link 38. Both the coil supporting links 36 and the intermediate links 38 are provided at each end with rollers 40 suitably disposed to run along either the upper or lower tracks 30 and 32. Thus it can be seen that each link will proceed from the remote loading station along the upper tracks 30 until it has passed through the compacting and strapping housing at coil receiving station A. Although not shown in the drawings, idler sprockets are positioned at the discharge end of the conveyor to provide a continuous support for the links as they reverse their direction of travel and proceed back to the remote loading station along the lower rails 32. Similarly, drive sprockets are positioned at the loading station to drive the conveyor belt 34 and to guide the links as they again reverse their direction to proceed along the upper rails 30 back to coil receiving station A. Thus it can be seen that the conveyor links 36 and 38 are continuously supported by either the upper or lower rails 30 and 32, depending on their direction of travel.

The coil supporting links 36 differ from intermediate links 38 in that their upper surfaces are angularly shaped to provide sloping coil contacting faces indicated typically at 42. As can be best seen FIG 4, the coil contacting faces 42 of adjacent coil supporting links 36 slope inwardly to provide a means of axially aligning the individual coils 14 on the conveyor flight. With this construction, a plurality of coils can be deposited on a conveyor flight and kept in substantial axial alignment as they proceed from a loading station to the coil receiving station. It is to be understood that the movement of conveyor 12 can be suitably indexed to cause a loaded flight to arrive at coil receiving station A with the common axis of the individual coils aligned with the longitudinal axis of the compacting and strapping apparatus 10.

As previously mentioned, the individual coils 14 receive axial support during their travel on conveyor belt 34 from the loading station to the coil receiving station by a series of upwardly disposed conveyor side fences 16 and 18. The fences extend upwardly from either side of the conveyor and cooperate with the coil supporting links 36 to contain each group of axially aligned coils.

In view of the above, it is evident that the axial support provided by conveyor fences 16 and 18 must be continued at coil receiving station A in order to prevent spreading or "brooming out" of the coils as they arrive within the compacting and strapping apparatus. For this reason, continuations of the coil conveyor side fences in the form of a rear gate 43 and a tilting fence 44 are provided at the coil receiving station.

As can be best seen in FIGS. 1, 2 and 4, the rear gate 43 is comprised of a carriage assembly 45 with a coil engaging portion 46 depending downwardly therefrom. The carriage assembly includes spaced parallel frame members 47 having rollers 48 extending outwardly therefrom. The rollers are positioned to ride along spaced parallel tracks 49 attached to the inner surfaces of parallel spaced supporting girders 20 and 22. It should be noted that the tracks 49 extend from a point to the left of coil receiving station A as viewed in FIG. 1 along the apparatus to the compacting and strapping station B.

As shown in FIGS. 1 and 4, the depending coil engaging portion 46 of the rear gate 43 terminates at its forward end in a substantially rectangular coil contacting face 50. When the rear gate is in its fully withdrawn position, coil contacting face 50 is so aligned as to cooperate with the conveyor side fences 18 in providing continuous axial coil support at coil receiving station A.

As can be seen in FIG. 1, tilting fence 44 provides a second coil contacting face 52 oppositely disposed from face 50 and located in the same plane as the upwardly disposed side fences 16 of conveyor 12. The tilting fence assembly will now be described in detail with particular reference to FIGS. 1, 5 and 6.

Tilting fence 44 is pivotally mounted at its lower end to beam 54 by means of a pivotal shaft 56 and associated bearings. Beam 54 is an integral part of the coil conveyor's supporting structure and as shown in FIGS. 1 and 6, provides a transversally extending support for the upper conveyor rails 30. As shown by the dotted lines in FIG. 6, tilting fence 44 may be pivoted downwardly about shaft 56 from an upwardly disposed operative position to a position indicated at 44a. Downward pivotal movement of the fence is finally arrested by the cooperative engagement of upwardly disposed fence stops 58 which contact fixed bumper 60.

The force required to pivot tilting fence 44 about shaft 56 is provided by a rotary hydraulic motor 62 operating through a rotatable drive shaft 64 extending outwardly from either side thereof. Lower intermediate links 66 are attached at their lower ends to the extremities of shaft 64, their upper ends being pivotally connected to a second set of upper intermediate links 68. The upper ends of links 68 are in turn pivotally attached to the upper end of tilting fence 44 may by means of transversally extending pivot pins 70. It can therefore be seen that upper and lower intermediate links 66 and 68 cooperate to form a linkage between drive shaft 64 of rotary hydraulic motor 62 and the upper end of the tilting fence. Clockwise rotation of shaft 64 will result in a downward displacement of tilting fence 44 to a position as indicated at 44a. By the same token, counterclockwise rotation of shaft 64 will return the fence to its upwardly disposed operative position.

Having thus described the basic components comprising coil receiving station A, the description will now proceed with a discussion of the means used for transporting the individual coils 14 from the coil receiving station to compacting and strapping station B. As can be seen in FIGS. 1, 2 and 3, a generally C-shaped carrier beam 76 is movably supported between parallel spaced supporting girders 20 and 22 for movement along the longitudinal axis of the compacting and strapping apparatus 10. The carrier beam is provided with an upper carriage assembly 78 comprised in part of front and rear transverse members 80 and 82 having front and rear sets of wheels 84 and 86 rotatably attached thereto at their extremities. As can be best seen in FIG. 2, front transverse member 80 is of a shorter length than rear transverse member 82 with the result that the front wheels 84 are positioned closer to the longitudinal axis of carrier beam 76 than the rear wheels 86. Front and rear wheels 84 and 86 are positioned to run on inner and outer carrier beam tracks 88 and 90 which are in turn attached to the parallel space supporting girders 20 and 22.

As illustrated in FIG. 3, at a point along the longitudinal axis of apparatus 10 indicated by the section line 3—3, both inner and outer carrier beam tracks 88 and 90 are mounted on the upper surfaces of supporting girders 20 and 22. At this point the tracks are in a horizontally aligned side by side relationship. However, as tracks 88 and 90 extend over coil receiving station A towards compacting and strapping station B, they are inclined upwardly until both sets of tracks attain a maximum elevated position as indicated in FIG. 5. However, as shown in FIG. 4, the inner and outer carrier beam tracks do not maintain a continuous side by side relationship as their respective elevations are being increased over coil receiving station A. More specifically, the point at which the outer tracks 90 begin to rise is located along the longitudinal axis of the apparatus at a selected distance from the point at which inner tracks 88 begin to rise. The selected distance is equal to the distance between the front and rear wheels 84 and 86 forming a part of the carriage assembly 78 of carrier beam 76.

With this construction, it is evident that movement of carrier beam 76 along the longitudinal axis of apparatus 10 will result in a progressive increase in its elevation as it passes over the coil receiving station A. Due to the staggered elevation of the inner and outer carrier beam tracks 88 and 90, both front and rear carriage wheels 84 and 86 will engage the inclined portions of inner and outer tracks 88 and 90 at the same time, resulting in turn in the horizontal disposition of the carrier beam being constantly maintained as its elevation is increased.

Carrier beam 76 is additionally provided with an underlying elongated ram 91 extending horizontally in substantial alignment with the longitudinal axis of apparatus 10. When in a totally withdrawn position as indicated in FIGS. 1 and 2, ram 91 is at a horizontal level corresponding to that of the central axis of coils 14 supported at coil receiving station A. In addition, the ram's extremity is located within a ram receiving slot 72 (see FIG. 4) cut through the depending coil engaging portion 46 of rear gate 43. Another ram receiving slot 73 extends through tilting fence 44 as indicated in FIG. 5. As further shown in FIG. 4, when ram 91 is totally withdrawn, its upper surface 83 is spaced vertically from the inner horizontal edge 85 of ram receiving slot 72 extending through rear gate 43.

It is therefore evident that as the carrier beam 76 is moved forward towards compacting and strapping station B, ram 91 will be axially threaded through the coils 14 contained on a loaded flight of the coil conveyor 12 at coil retaining station A. Forward motion of the ram will not be obstructed by either the rear gate 43 or the tilting fence 44 due to the ram receiving slots 72 and 73 extending through both components. As carrier beam 76 passes over coil receiving station A, its elevation will be progressively increased as previously explained by the combined action of its front and rear wheels 84 and 86 rollnig up the staggered inclined portions of inner and outer carrier beam tracks 88 and 90. This in turn will cause ram 91 to be elevated through a corresponding distance until its upper surface 83 contacts the inner diameter of the coils 14. Since the horizontal disposition of the ram is maintained throughout this elevation, each individual coil 14 will be contacted at approximately the same time. At this point, the rear gate 43 will be contacted by carrier beam 76 and the tilting fence 44 physically displaced to its downward position as indicated at 44a in FIG. 6. It can therefore be seen that as the forward motion of the carrier beam 76 is continued towards coil compacting and strapping station B, both the individual coils 14 depending from the ram 91 and the rear gate 43 will be correspondingly carried forward.

The means of displacing the carrier beam 76 along tracks 88 and 90 from a withdrawn position as indicated in FIG. 1 towards compacting and strapping station B will now be described with particular reference to FIGS. 1, 2, 3 and 21. As can be seen in FIGS. 1–3, the carriage assembly 78 of carrier beam 76 is provided at its forward end with a transverse arm 92 pivotally attached at its midsection to front transverse member 80 by a pivot pin 94. Two single strand heavy duty roller chains 96 and 98 are attached at one end to the extremities of transverse arm 92 by means of U-bolts 100. The chains extend horizontally beneath arches 28 towards drive sprockets 102 and 104 (see FIG. 21) at the right hand side of the apparatus 10 as viewed in FIG. 1. The chains 96 and 98 pass over drive sprockets 102 and 104 and thereafter extend in a reverse direction back under arches 28 towards idler sprockets 106 and 108. After passing over the idler sprockets, the chains are attached to rear transverse member 82 of the carrier beam's carriage assembly 78 by means of adjustable turnbuckles 110. By adjusting turnbuckles 110, the tension in chains 96 and 98 may be controlled. Idler sprockets 106 and 108 are keyed to an idler shaft 112 rotatably mounted between antifriction pillow blocks 114. The pillow blocks are in turn mounted on raised ends of the parallel spaced supporting girders 20 and 22 as viewed in FIG. 1.

Drive sprockets 102 and 104 are keyed to a drive shaft 116 journaled for rotation between antifriction pillow blocks 118 extending upwardly from the opposite ends of support girders 20 and 22. Torque is supplied to drive shaft 116 by a hydraulic motor 120 driving through a gear reducer 121, shaft 122, sprocket 123 and double strand heavy duty roller chain 124 extending between sprocket 123 and an aligned sprocket 125 mounted on the drive shaft 116. Chain 124 is enclosed within a protective housing 126 in order to prevent injury to operating personnel.

As can further be seen in FIGS. 3, 4 and 5, the upper strands of both chains 96 and 98 extending between the drive sprockets 102 and 104 and the idler sprockets 106 and 108 are supported by downwardly disposed U-shaped chain carriers 128 attached to the arches 28 in order to prevent the chains from sagging under their own weight.

With this drive arrangement, it can be seen that operation of hydraulic motor 120 in either a counterclockwise or clockwise rotation will result in a carrier beam 76 being displaced along the longitudinal axis of the apparatus 10 in either a forward or backward direction. Lateral movement of the carrier beam 76 will of course be restricted by its front and rear wheels 84 and 86 riding on inner and outer carrier beam tracks 88 and 90.

Having thus described the drive means for imparting motion to carrier beam 76 along inner and outer tracks 88 and 90 and the sequence of operation as a group of individual coils are picked up at coil receiving station A by horizontally disposed ram 91, attention will now be directed to the various components comprising compacting and strapping station B.

As shown in FIGS. 1 and 2, a compacting mechanism generally indicated by the referenced numeral 134 is positioned beneath parallel spaced supporting girders 20 and 22. As can be better seen in FIGS. 18, 19 and 20, the compacting mechanism 134 is provided with a housing structure having a base plate 135 bolted to structural beams at the mill floor level by means of bolts indicated typically at 136. A front plate 137 and side plates 138 extend upwardly from base plate 135 to be joined at their upper extremities by a top plate 139. Compacting cylinders 140 extend horizontally in parallel spaced relationship through the housing structure and are affixed to front plates 137 by means of collars 141 and bolts indicated typically at 142. Compacting cylinders 140 are internally provided with extensible piston arms 143 having enlarged end extremities adapted to be attached by mounting collars 144 to rear plate 145 comprising a part of the downwardly depending coil engaging portion of compacting gate 146.

Compacting gate 146 is comprised of an upper carriage assembly having outwardly extending wheels 147 rotatably mounted on transversely disposed axles 148. Axles 148 are in turn journaled within bearings indicated typically at 149 mounted on parallel supporting members 150 and 151. The wheels 147 are so positioned as to ride along tracks 49 attached to the inwardly disposed surfaces of longitudinal supporting girders 20 and 22.

Thus it can be seen that the compacting gate 146 is movably mounted on the same set of tracks 49 as the rear gate 43. Consequently, extension or withdrawal of piston arms 143 within compacting cylinders 140 will result in horizontal displacement of compacting gate 146 along the longitudinal axis of the apparatus 10 at a level corresponding to that of rear gate 43.

Turning now to a more detailed description of the downwardly extending coil engaging portion of compacting gate 146, it can be seen that both rear and front plates 145 and 152 depend downwardly in spaced relationship from the parallel supporting members 150 and 151. As can be best seen in FIG. 22, front plate 152 is provided with a substantially rectangular ram receiving aperture 153, a similar aperture being provided in rear plate 145 in alignment therewith as partially indicated in FIG. 19. It can therefore be seen that the apertures 153 in both front and rear plates 145 and 152 cooperate to provide a ram receiving passageway extending through the downwardly depending coil engaging portion of rear gate 43. With this construction, as carrier beam 76 arrives at the compacting and strapping station B, the forward end of ram 91 will readily pass through the passageway in compacting gate 146 formed by apertures 153 to be thereafter placed in locked engagement within the housing structure cf compacting mechanism 134.

Figure 18:
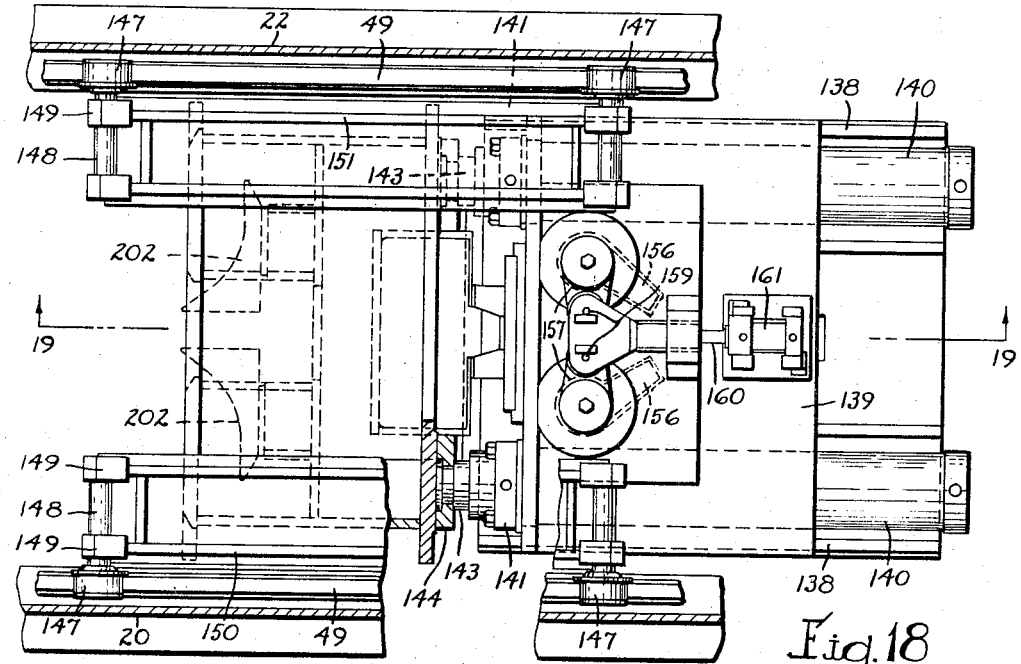
FIG. 18 is an enlarged sectional view in plan taken along line 18—18 of FIG. 1.
Figure 19:
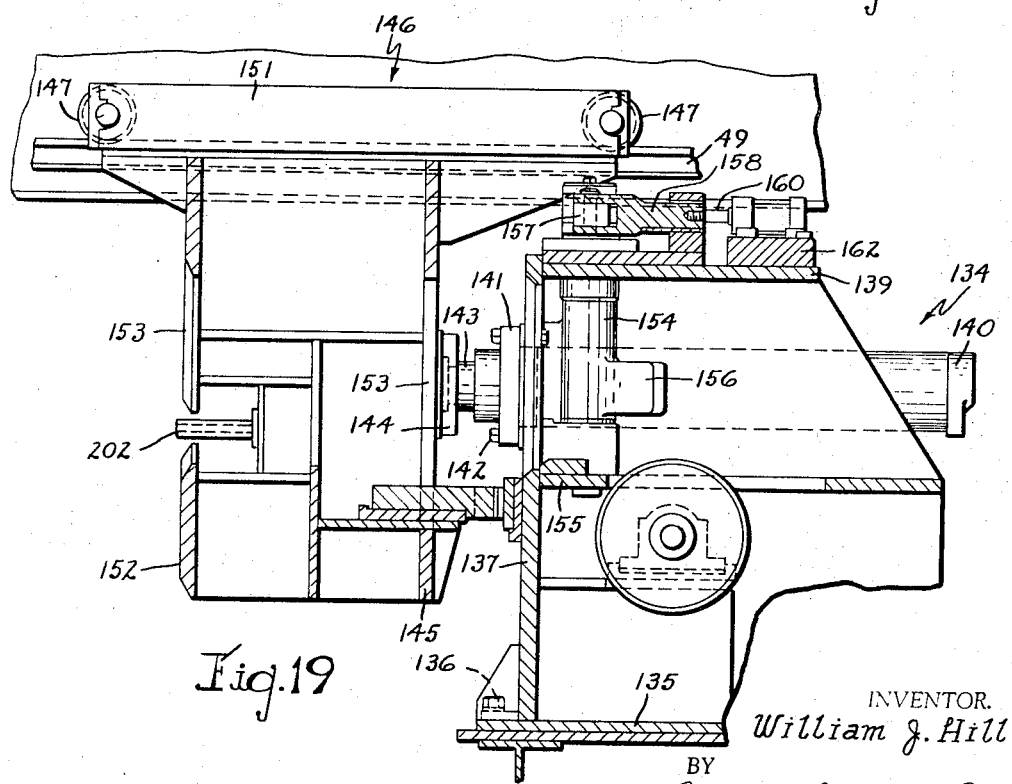
FIG. 19 is a sectional view in elevation taken along line 19—19 of FIG. 18.
Figure 21:
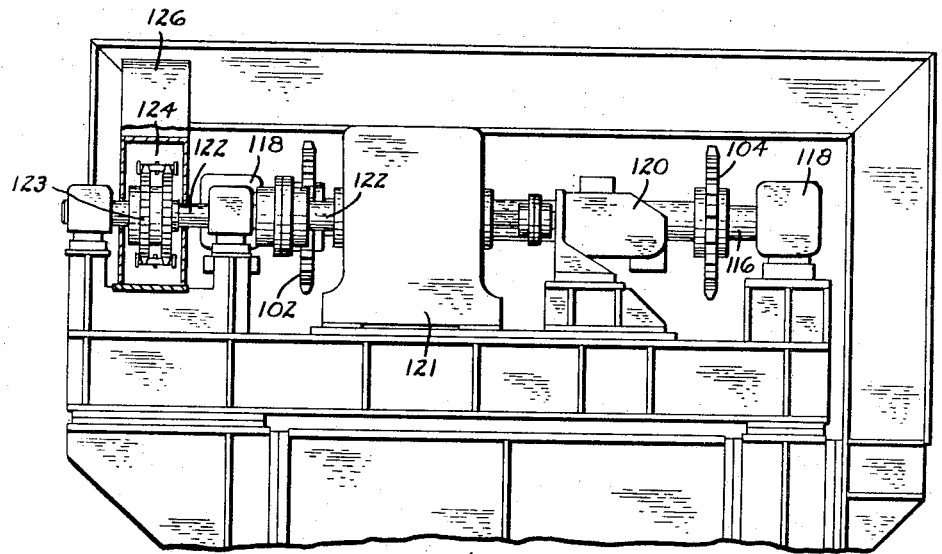
FIG. 21 is a partial end elevation of the compacting and strapping apparatus taken along line 21—21 of FIG. 1 showing the carrier beam driving mechanism.

The means for providing an interlocked relationship between carrier beam 76 and compacting mechanism 134 will now be described. As shown in FIGS. 18 and 19, two vertically disposed locking arms 154 are rotatably mounted between upper plate 139 and an intermediate plate 155, each arm being provided with transversally disposed locking extension 156. The upper ends of the locking arms 154 are further provided with connecting links 157 having their inwardly disposed extremities pivotally connected to a bifurcated member 158 by means of pivot pins indicated typically at 159. Member 158 provides an extension of extensible piston arm 160 slidably contained within hydraulic locking cylinder 161. Locking cylinder 161 is in turn supported by an intermediate block 162 mounted on upper plate 139.

Figure 20:
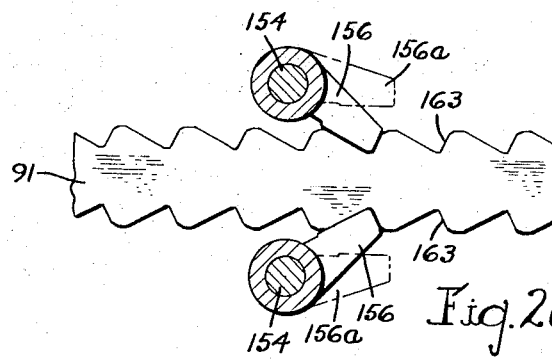
FIG. 20 is an enlarged diagrammatic sketch of the ram locking mechanism.

As shown in FIG. 20, withdrawal of piston arm 160 into locking cylinder 161 will result in bifurcated member 158 being pulled back, this action in turn resulting in the locking extensions 156 of rotatably mounted locking arms 154 being pivoted outwardly to an unlocked position as indicated by the reference numerals 156a. When so positioned, an enlarged unrestricted space is provided between the upwardly disposed locking arms 154. Since this space is in approximate alignment with the ram receiving apertures 153 in both the rear and front plates 145 and 152 of compacting gate 146, an unrestricted path is provided through both the compacting gate and the housing structure of compacting mechanism 134. Thus it can be seen that as the carrier beam 76 arrives at compacting and strapping station B, the end of the ram 91 will pass through compacting gate 146 and thereafter enter into the housing structure of compacting mechanism 134 to be positioned between spaced upwardly disposed locking arms 154 as generally indicated in FIG. 20. It should at this time be noted that the end of ram 91 is provided along either side with a series of locking notches indicated typically at 163. As shown in FIG. 20, subsequent inward pivotal displacement of locking extension 156 under the influence of locking cylinder 161 will result in their extremities being seated in locked engagement within a pair of oppositely disposed locking notches 163. When so positioned, ram 91 will be prevented from being withdrawn from the compacting mechanism 134, thereby providing an interlocked relationship between carrier beam 76 and compacting mechanism 134.

It should be mentioned at this time that as the carrier beam 76 is advanced towards compacting and strapping station B, its forward motion will eventually be arrested as the coils 14 depending from ram 91 are initially compressed between rear gate 43 and compacting gate 146. The exact point at which forward motion of the carrier beam will stop is of course controlled to a great extent by the number of coils depending from ram 91. This relationship will in turn control the seating of locking extensions 156 within one of a series of opposed pairs of locking notches 163 on the ram.

In operation, carrier beam 76 is advanced towards compacting and strapping station B until ram 91 is axially inserted through the compacting gate 146 into the housing structure of the compacting mechanism. Once forward motion of the carrier beam has been arrested by the initial limited compaction of coils between rear gate 43 and compacting gate 146, the hydraulic locking cylinder 161 is then actuated to extend piston arm 160 and thereby pivotally displace locking extensions 156 to their inwardly disposed positions as indicated by the solid lines in FIG. 20. This inward pivotal displacement will result in the extremities of the locking extensions 156 being seated within one of a series of opposed pairs of locking notches 163 on ram 91. Subsequent withdrawal of the ram once this interlocked relationship has been achieved between the carrier beam 76 and the compacting mechanism 134 is thereby prevented.

At this point, the individual coils 14 depending from ram 91 are in a tightly contained and slightly compacted state between rear gate 43 and compacting gate 146. Thereafter, the compacting cylinders 140 are actuated in order to advance compacting gate 146 along tracks 49 towards rear gate 43 with the result that the coils are compacted into a bundle of predetermined length.

Since ram 91 provides the connecting link between compacting mechanism 134 and rear gate 43, it will be placed in tension as the coils are compacted. Several significant advantages are gained through this relationship. More particularly, by providing a high strength link in the form of ram 91 between the rear gate 43 and the compacting mechanism 134, relative motion of one with respect to the other during the compacting cycle is prevented. This in turn results in more uniform compaction for any given stroke of the compacting cylinders 140.

In addition, the distance between the rear gate 43 and the retracted compacting gate 146 can be accurately adjusted prior to the commencement of the compacting cycle by simply selecting one of a series of locking notches 163 on the ram 91. When the ram is locked to the compacting mechanism, the coils 14 will be tightly positioned between rear gate 43 and compacting gate 146. With this construction, compaction will begin as soon as the compacting cylinders are actuated, thereby avoiding wasted piston and compacting gate motion. Furthermore, by selecting the same pair of oppositely disposed locking notches 163 on the ram 91, a constant compacting force can be exerted on each succeeding bundle containing the same number of coils, thereby producing a plurality of bundles having constant axial lengths.

Following compaction of the individual coils 14 by the advancement of compacting gate 146 towards the rear gate 43, the coils must then be strapped in order to retain their compressed state and thereby produce a unitized damage resistant bundle. The strapping is accomplished by the applicant's apparatus through the use of strapping machines 164 and 166 attached to either side of compacting gate 146 (see FIG. 22) for movement therewith during the compacting cycle. Strapping machines 164 and 166 are designed to play out a length of retaining strap along any predetermined path suitably defined by strap guides. The path usually extends around the material to be strapped and thereafter returns to the strapping machine where it is pulled tight, crimped and cut. Since the strapping machines are of a conventional commercially available type as for example Acme Model No. F5D10 they will not be described in detail in connection with the present invention. However, the construction and positioning of the strap tracks to be used in guiding the retaining strap in its travel around the compacted coils will be discussed in order to explain the overall strapping cycle.

When compacted, the coils combine to form a substantially tubular structure depending from ram 91. It can therefore be appreciated that each retaining strap to be applied to the coil bundle must initially extend along the outside of the bundle in a direction substantially parallel to the bundle's longitudinal axis. The strap must then be guided around the end coil in a 180° turn to thereafter proceed back along the inside of the coil bundle. When the opposite end of the bundle is reached, the strap must make another similar turn before being guided back to the strapping machine from whence it originated.

Figure 33:
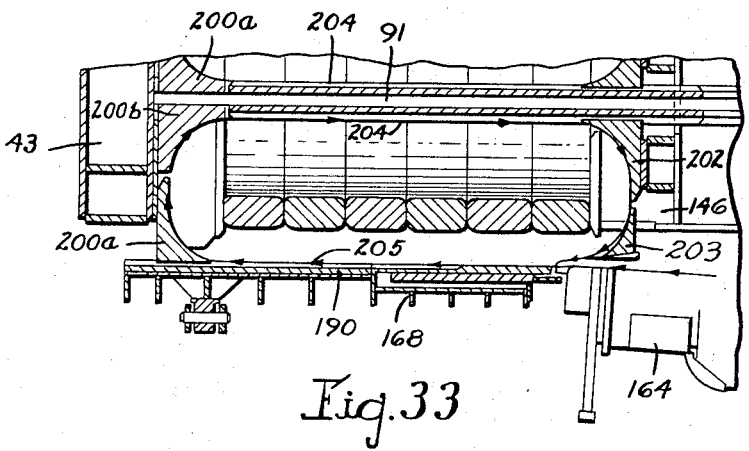
FIG. 33 is a diagrammatic illustration of the path travelled by one retaining strap during the strapping cycle.

The applicant's apparatus is so constructed as to provide means for applying two retaining straps to the compacted coils along the above described paths at angular intervals of 180°. As can be seen from the diagrammatic illustration contained in FIG. 33, strapping machine 164 is mounted on the compacting gate 146 at the outer edge thereof. As shown in FIG. 33, compacting gate 146 has been advanced through the compacting cycle by the extension of pistons 143 thereby resulting in compaction of coils 14 depending from ram 91.

In order to guide the retaining straps as they are emitted from the strapping machines, swinging strap tracks 168 and 170 are pivotally mounted to the longitudinal supporting girders 20 and 22 in the area adjacent the compacting and strapping station. Since both swinging strap tracks 168 and 170 are substantially identical in construction, their description will proceed with particular reference to FIGS. 23 and 24 showing only swinging strap track 168. It should however be noted that the following description of swinging strap track 168 will apply equally as well to swinging strap track 170.

Swinging strap track 168 is comprised basically of an elongated track supporting frame member 171 pivotally mounted along its upper edge by means of an elongated pivotal shaft 172 journaled at its extremities for rotation within bearings 173. Bearings 173 are in turn attached to the lower face of girder 20 and depend downwardly therefrom. As shown in FIG. 24, frame member 171 is capable of being pivotally displaced about shaft 172 from a downwardly disposed operative position through an angle of approximately 90° to an upwardly disposed position indicated by the reference numeral 171a. The means for producing this pivotal displacement will now be described. A hydraulic motor 174 is mounted on plate 175 extending between the upper and lower flanges of girder 20 with its rotatable shaft 176 extending horizontally therefrom. An intermediate link 177 having its upper extremity keyed to shaft 176 for rotation therewith is in turn pivotally connected at its lower extremity by means of pivot pin 178 to a second intermediate link 179. Link 179 is in turn pivotally connected at its lower bifurcated extremity by means of pivot pin 180 to an outwardly disposed bracket 181 attached to the lower portion of frame 171. With this construction, it can readily be seen that by actuating motor 174 and causing shaft 176 to rotate in a clockwise direction, the link mechanism comprising the combination of intermediate links 177 and 179 will cause frame 171 to rotate upwardly about shaft 172 until a position as indicated by the reference numeral 171a is attained. At this point, the frame member may be locked in its upwardly disposed position by pulling handle 182 which will operate through an associated link mechanism to rotate hook member 184 about pin 186 into locked engagement with raised catch 188 on link 177. When pivotally displacing track supporting frame member 171 to its downwardly disposed operative position, handle 182 need only be raised to disengage hook member 184 and the motor 174 actuated to rotate shaft 176 in a counterclockwise direction.

As can further be seen in FIG. 24, frame member 171 is provided along its lower edge with a conventional elongated strap track 190. As can be seen in FIGURE 34, strap track 190 is comprised basically of a generally L-shaped frame 192 welded to the lower edge of frame member 171 as at 193. A strap guide 194 having a generally H-shaped cross-section is mounted within frame member 192 and provided with outwardly disposed spring loaded retaining fingers 196. The retaining strap indicated typically at 197 is guided in its longitudinal travel within strap track 190 by the inwardly disposed portions of retaining fingers 196. When the strap is subsequently tightened by the action of strapping machines 164 or 166, it is pulled outwardly in a direction as indicated in FIG. 34 resulting in the spreading of retaining fingers 196 against the compressive force of springs 198 mounted on transversely disposed pins 199. With this construction, it can readily be seen that the strap may be axially inserted through strap track 190 in a retained position between guide 194 and the inwardly disposed portions of retaining fingers 196. The strap may thereafter be disengaged from the strap guide when tightened by the strapping machines by simply being pulled outwardly with a force sufficient to spread the spring loaded retaining fingers 196.

As can be best seen from a reference to FIG. 33 in combination with FIGS. 3, 18, 19 and 22, both ram 91 and compacting gate 146 are provided with cooperative extensions of track 190 on swinging strap track 168. More particularly, ram 91 is provided on each side with two concave strap seats 200a and 200b. In a similar manner, compacting gate 146 is provided on either side with one concave strap seat 202 attached to its inner frame structure. Strap seat 202 is designed to cooperate with a similarly curved portion 203 (see FIG. 33) of strapping machine 164. In addition, each side of ram 91 is provided with tracks 204 identical in construction to those mounted on swinging strap tracks 168 and 170.

As shown in FIG. 33, following the insertion of ram 91 through rear gate 146 and the compaction of coils 14 between the rear gate 43 on one side and the compacting gate 146 on the other side, strap seats 200a and 200b together with strap seat 202 and the curved portion 203 of strapping machine 164 cooperate with the longitudinal strap tracks 190 and 204 on the swinging strap track 168 and ram 91 respectively to provide a continuous generally rectangular shaped path for the retaining strap being emitted by strapping machine 164. As indicated diagrammatically by arrows 205, the retaining strap is played out by the strapping machine 164 and directed along the outside of the coils by strap track 190 mounted on swinging strap track 168. It is thereafter guided through a 180° turn by strap seats 200b and 200a and thereafter directed along strap track 204 on ram 91 in the opposite direction. Upon reaching the other end of its longitudinal travel, the retaining strap is then guided back to the strapping machine 164 by strap seat 202 and curved portion 204. The strapping machine then completes the strapping cycle by first tightening the retaining strap around the coils and then crimping and cutting it when the desired tension has been achieved. As previously mentioned, tightening of the retaining strap 197 will result in its disengagement from all strap guides.

Following the operation of both strapping machines 164 and 166, it can readily be appreciated that two sets of retaining straps have been applied to the compacted bundle at 180° intervals. The compacting gate 146 is then partially withdrawn and the bundle rotated through an angle of 90° in order to permit application of a second set of retaining straps. The means utilized in rotating the bundle will now be described with particular reference to FIGS. 7, 8, 9 and 10 through 17.

A coil elevator generally indicated by the reference numeral 206 is positioned at compacting and strapping station B in order to provide a means of raising the partially strapped bundle of coils from its supported position on ram 91. The elevating mechanism of the coil elevator will now be described in more detail. As can be seen in FIG. 7, an elevator base 208 is provided beneath the mill floor as part of the mill foundation. A rectangular frame 210 is bolted on elevator base 208 by bolts 212 and is provided with matching sets of upwardly extending pivotal supporting links 214 and 216. The links are pivotally connected at their midsections by means of a horizontally disposed pivotal shaft 218 to provide a collapsible support for an overlying lower elevator platform 220. The lower ends of links 214 are pivotally connected by pins 221 between bearings 222 and opposed brackets 223 to frame 210, their upper ends provided with rotatable wheels 224 disposed to ride along short parallel tracks 226 on the underside of lower elevator platform 220. In a similar fashion (see FIG. 9) the upper ends of links 216 are pivotally connected to the underside of elevator platform 220, their lower ends provided with wheels 228 designed to run along parallel tracks 229 on the upper surface of frame 210 between upwardly disposed stops 230 and 232. Each set of matching links 214 and 216 are additionally provided with transverse bracing members 234 and 236 in order to further strengthen the collapsible support structure.

A vertically disposed hydraulic jack cylinder 238 is positioned at one side of the elevator between lower elevator platform 220 and frame 210. The lower bifurcated end of cylinder 238 is pivotally connected to frame 210 by means of a pin 239 and bracket 240. The upper extremity of its extensible piston 242 is in turn pivotally connected to lower elevator platform 220 by means of a second pin 243 and bifurcated bracket 244.

Figure 8:
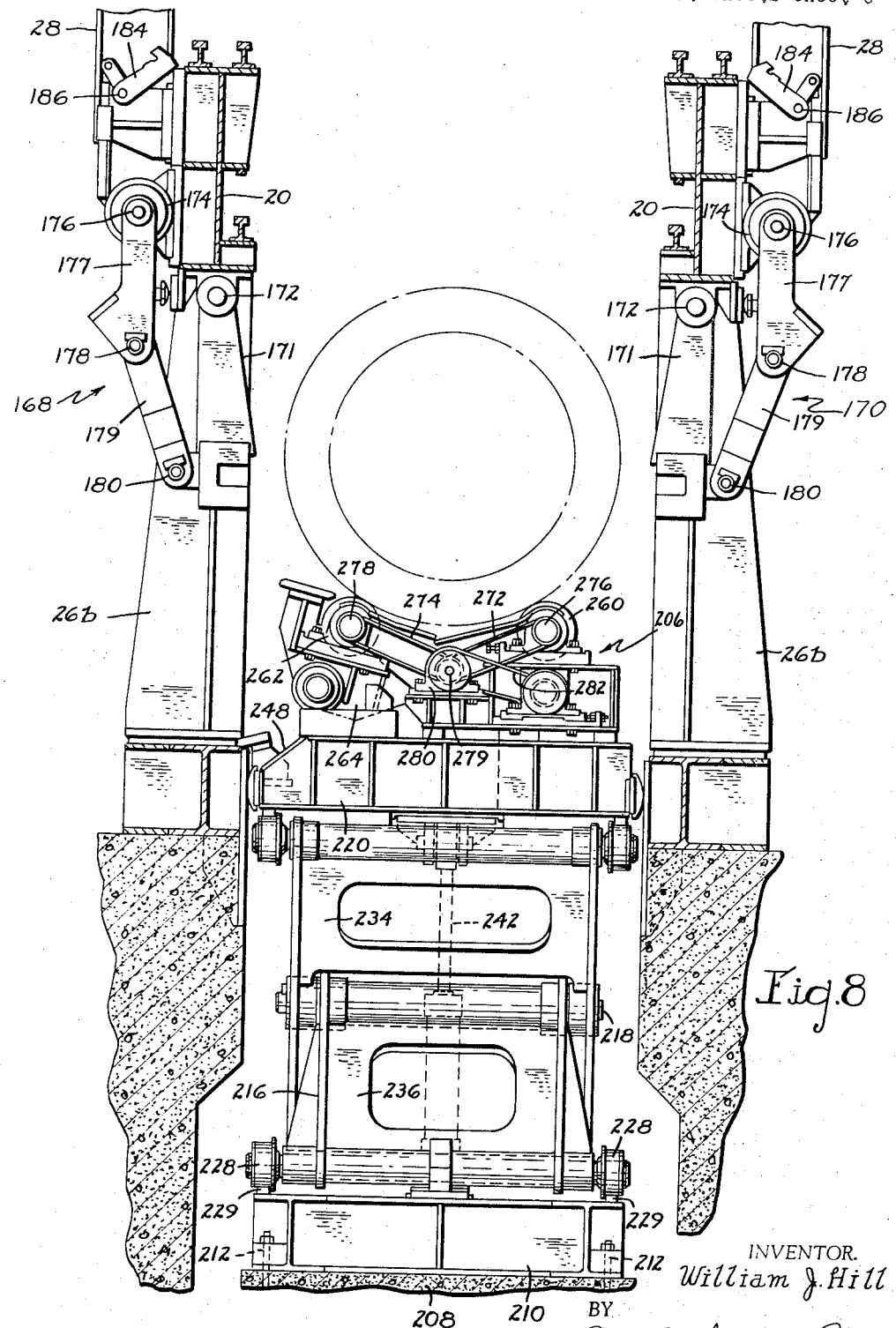
FIG. 8 is an enlarged sectional view taken along line 8—8 of FIG. 1 showing the coil elevator in a raised position.
Figure 9:
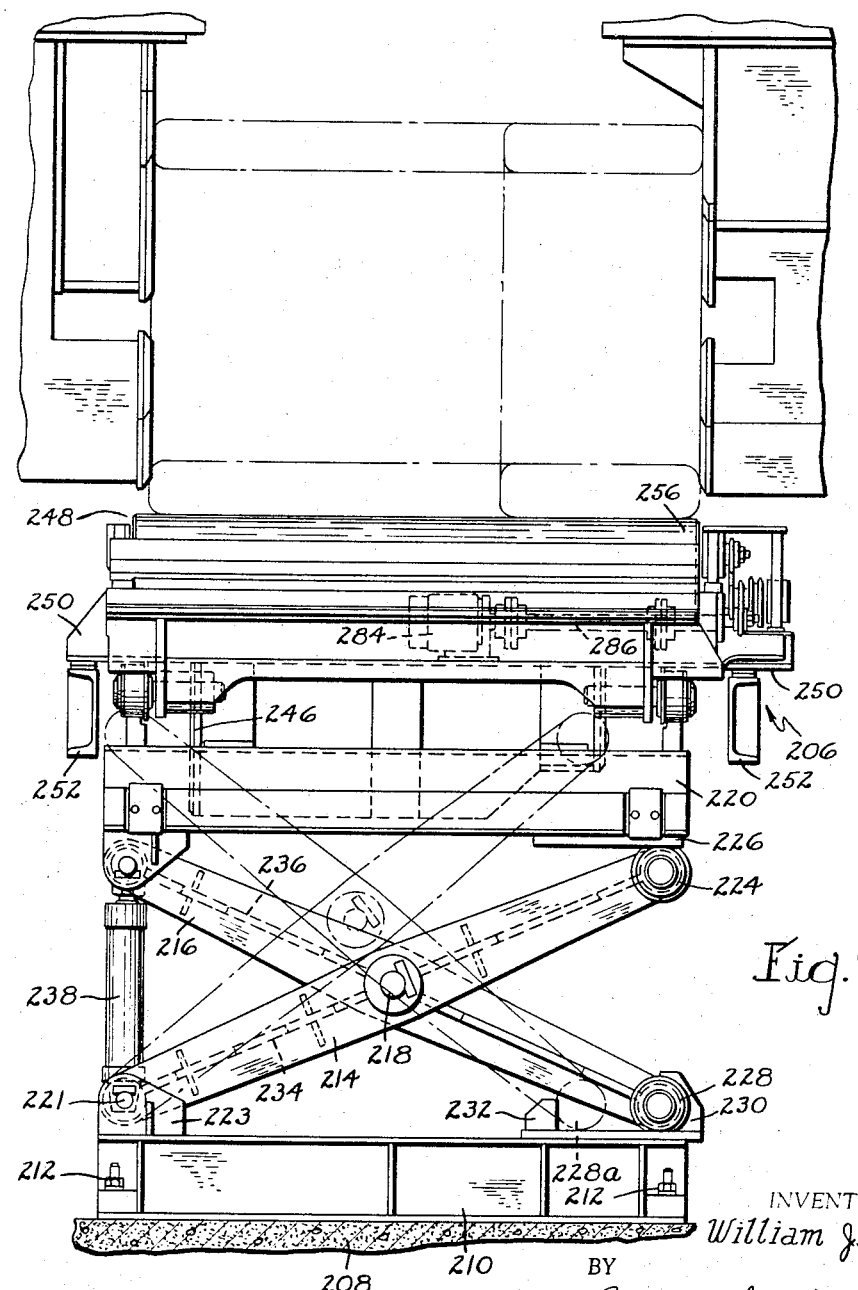
FIG. 9 is a view in side elevation of the coil elevator in a lowered position.

With this construction, it is readily apparent as shown in FIG. 8 that the extension of piston arm 242 within cylinder 238 will result in lower elevator platform 220 being upwardly displaced with respect to its lower base frame 210. When being vertically displaced, the upper and lower extremities of pivotally connected links 214 and 216 which are provided with wheels 224 and 228 will roll along the upper and lower parallel tracks 226 and 229 of elevator platform 220 and lower frame 210. Maximum elevation will be attained when wheels 228 engage stops 232 as shown in FIG. 9 at 228a. Similarly, when piston arm 242 is withdrawn in order to lower elevator platform 220, its downward movement will be arrested as wheels 228 engage opposing stops 230. In this manner, the cylinder 238 need not support the entire weight of the lowered elevator structure.

Lower elevator platform 220 is further provided with a centrally located rectangular passageway adapted to receive the lower extension 246 of upper elevator platform 248 in slidable engagement therein. Upper elevator platform 248 is in turn provided with oppositely disposed extensions 250 (see FIG. 9) extending beyond the extremities of the platform to engage transverse supporting members 252 forming a part of the stationary structure of the compacting and strapping apparatus.

With this construction it can be seen that when the lower elevator platform 220 is fully depressed as shown in FIG. 9, the upper elevator platform will remain suspended between transverse supporting members 252 on extensions 250. As jack cylinder 238 is operated to raise platform 220, the lower rectangular extension 246 of upper platform 248 will be slidably received within the centrally located passageway in platform 220. The lower elevator platform 220 will continue to rise with respect to the upper platform 248 until the lower platform has reached a position as indicated in 220a in FIG. 7. At this point, the lower platform will engage the upper platform with nonmetallic pads 254, positioned on the upper surface of platform 220 being interposed therebetween. Further extension of piston 242 will result in both the upper and lower elevator platforms 248 and 220 being vertically displaced simultaneously. The importance of this relationship will hereinafter become apparent in connection with the description of the means for rotating the bundle of partially strapped coils through an angle of 90°.

Two elongated bundle engaging rollers 256 and 258 are rotatably mounted on upper elevator platform 248. Roller 256 is journalled between bearings 260 for rotation about an axis fixed with respect to the upper elevator platform 248. In contrast, roller 258 is journalled between bearings 262 in turn mounted on pivotal arms 264. The arms 264 are substantially C-shaped and pivotally attached at one end to the upper elevator platform as at 266 for pivotal movement as indicated in FIG. 7. The other end of arms 264 are provided with flat upwardly disposed faces 268 designed to cooperate when in a lowered position with extensions thereof in the form of brackets 270 attached to the stationary frame structure.

As shown in FIG. 8, both rollers 256 and 258 are driven by means of belts 272 and 274 extending from pulleys 276 and 278 to intermediate pulleys mounted on shafts 279. Shaft 279 is in turn rotatably mounted on a fixed axis between bearings 280. Intermediate shaft 279 is in turn driven through a belt 282 by means of motor 284 and shaft 286 (see FIG. 9). With this arrangement, operation of motor 284 will result in the rotation of both bundle engaging rollers 256 and 258.

Figure 10:
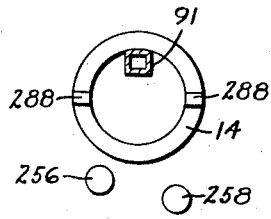
FIGS. 10-17 are diagrammatic illustrations depicting the operational sequence of the bundle rotating mechanism associated with the coil elevator during a typical compacting and strapping cycle where the bundle is to be strapped at 90° intervals.
Figure 11:
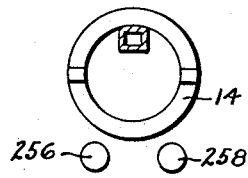
Figure 12:
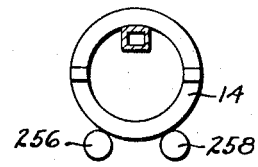
Figure 13:
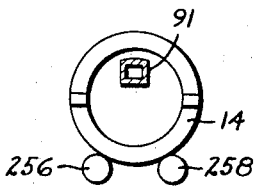
Figure 14:
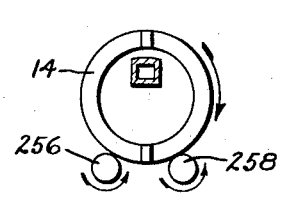
Figure 15:
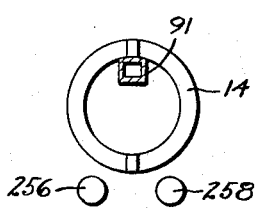
Figure 16:
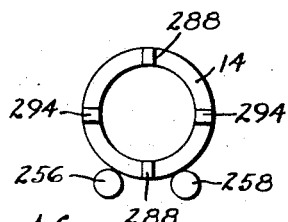
Figure 17:
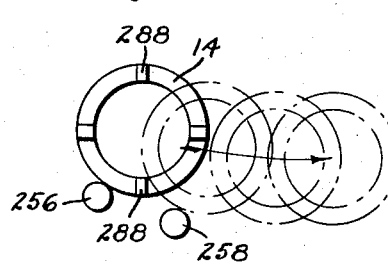

The sequence of operation of the coil elevator 206 will now be described with additional reference to the diagrammatic illustrations contained in FIGS. 10 to 17. As shown in FIG. 10, the partially strapped coil bundle 14 having two straps 288 attached thereto is shown depending from the ram 91 with the bundle engaging rollers in a fully depressed position similar to FIG. 7. At this point the strapping machines 164 and 166 have completed a cycle and the compacting gate 146 has been partially withdrawn. Jack cylinder 238 is then actuated to begin raising lower elevator platform 220. As platform 220 begins to rise, its raised portion 290 will immediately engage wheels 292 on pivotal arms 264, causing them to pivot upwardly about point 266. This action will continue until both rollers 256 and 258 are at the same elevation as shown in FIG. 11. At this point, lower elevator platform 220 will engage upper elevator platform 248 as previously discussed, both platforms then rising simultaneously until rollers 256 and 258 come into engagement with bundle 14 as shown in FIG. 12. Further elevation of the platforms will of course result in the coil bundle 14 being lifted from its depending position on ram 91. At this point, with the bundle supported by the coil elevator 206 as shown in FIG. 13, motor 284 is actuated to rotate rollers 256 and 258, causing the bundle 14 to rotate through an angle of 90° as shown in FIG. 14. The coil elevator is then partially depressed until the bundle is again placed in a depending relationship on ram 91 as shown in FIG. 15. The compacting gate 146 is then advanced to recompact the coils and the strapping machines are recycled in order to attach a second set of straps 294 to the coil bundle. The coil elevator is again raised as indicated in FIG. 16 to the same level as shown in FIG. 13 and the ram 91 disengaged from the compacting mechanism and totally withdrawn. This having been done, the coil elevator is completely depressed to its original position as shown in FIG. 10 thereby causing the completely strapped coil bundle to be laterally discharged from the coil compacting and strapping apparatus as shown in FIG. 17.

Having thus described the principal components of the compacting and strapping apparatus 10, the overall sequence of its operation will now be reviewed with reference to FIGS. 25 to 32.

Referring initially to FIG. 25, the coil compacting and strapping apparatus 10 is shown in its coil receiving position with the carrier beam 76 in a fully retracted position to the left of coil receiving station A. The rear gate 43 and tilting fence 44 are aligned with conveyor fences 16 and 18 in order to provide continuing axial support for the individual coils 14 axially aligned on a loaded flight of conveyor 12. The compacting gate 146 is fully retracted and the ram locking extensions 156 pivotally displaced to their open position. In addition, the coil elevator 206 is in its fully lowered position and the swinging strap tracks 168 and 170 pivoted to their upwardly disposed position. With the aforementioned components so positioned, the apparatus is prepared to commence the compacting and strapping cycle.

As shown in FIG. 26, hydraulic drive motor 120 has been actuated in a counterclockwise direction in order to advance the carrier beam 76 to a point at which ram 91 is fully threaded through the axially aligned individual coils 14 contained at coil receiving station A. During the advancement of the carrier beam 76 from its fully retracted position as shown in FIG. 25 to its present position, it should also be noted that the swinging strap tracks 168 and 170 have been pivotally displaced to their downward operative position as shown in detail in FIGS. 23 and 24.

Continuing on its forward motion towards compacting and strapping station B, the carrier beam 76 decelerates to contact rear gate 43. The tilting fence 44 is then pivoted to its downward position after the front and rear wheels 84 and 86 of carriage assembly 78 in cooperation with the raised portions of inner and outer carrier beam tracks 88 and 90 have raised the carrier beam in order to bring ram 91 into contact with the coils 14.

As shown in FIG. 27, the carrier beam 76 has contacted the rear gate 43, picked up the individual coils 14 from coil receiving station A and advanced to compacting and strapping station B. At this point, the ram 91 has passed through apertures 153 in the compacting gate 146 and has been extended into the housing structure compacting mechanism 134. In addition, hydraulic locking cylinder 161 has been actuated to pivot the locking extensions 156 inwardly into a locked position in cooperation with the locking notches 163 positioned on each side of ram 91.

As previously mentioned, the alignment of a particular opposed pair of locking notches with the locking extensions is governed by the number of coils depending from the ram 91.

With the ram 91 in interlocked engagement with the compacting mechanism 134, the compacting cylinders are actuated in order to advance a compacting gate 146 towards the rear gate 43 and thereby effectuate compaction of the coils positioned therebetween. As shown in FIG. 28, the coils 14 have been compacted and the strapping machines allowed to complete their strapping cycle. At this point, the coils have been compacted and strapped at 180° intervals.

As shown in FIG. 29, compacting cylinder pressure has been released and the compacting gate 146 withdrawn slightly from the strapped bundle of coils. Coil elevator 206 is then eleveated in order to raise the coils about ram 91. With this accomplished, the bundle is rotated 90° through the combined action of bundle rollers 256 and 258.

The coil elevator 206 is then lowered as shown in FIG. 30 in order to redeposit the bundle on ram 91. The compacting cylinders 40 are then reactuated to recompact the coils and allow the strapping machines to pass through another strapping cycle. At this point, the coil bundle has been strapped in four places at 90° intervals.

With the compacting and strapping operation completed, the compacting cylinders are actuated to fully retract the compacting gate. In addition, the locking extensions 156 are disengaged from the ram 91 and the coil elevator 206 fully raised. The carrier beam 76 is then withdrawn to its fully retracted position as shown in FIG. 31 carrying with it the rear gate 43.

With the carrier beam 76 fully withdrawn, the swinging strap tracks are then pivotally displaced to their upward position in order to provide sufficient clearance from the discharge of the bundle from the compacting and strapping apparatus. The coil elevator 206 is then fully lowered as shown in FIG. 32 to discharge the bundle and the tilting fence 44 returned to its upward position. The compacting and strapping apparatus 10 is now prepared to receive another group of individually aligned coils at the receiving station.

It is my intention to cover all changes and modifications of the invention herein chosen for purposes of disclosure which do not constitute departures from the spirit and scope of the invention.

I claim:

1. In a rolling mill, coil handling apparatus for assembling a plurality of individual rod coils into compacted unitized bundles, said apparatus comprising the combination of: a housing including a coil receiving station and a compacting and strapping station; said coil receiving station provided with coil receiving means including a movable gate for supporting and axially containing a plurality of individual rod coils; coil carrier means associated with said housing for movement between said coil receiving station and said compacting and strapping station, said coil carrier means cooperating with said movable gate when moving towards said compacting and strapping station to collect and carry said individual rod coils to said compacting and strapping station; coil compacting means at said compacting and strapping station; interlocking means for placing said coil carrier means carrying said individual rod coils in cooperative engagement with said coil compacting means, said compacting means when actuated cooperating with said coil carrier means and said movable gate to axially compact said rod coils; strapping means for strapping said compacted coils into a unitized bundle; and bundle removal means for removing said bundle from said coil handling apparatus following the completion of the strapping operation.

2. The apparatus as set forth in claim 1 wherein said housing is provided with a basic frame structure comprising two longitudinal supporting members extending horizontally over the mill floor in a spaced parallel relationship.

3. The apparatus as set forth in claim 1 wherein said coil receiving means is comprised of a substantially horizontal loading surface, said loading surface being adapted to support a plurality of said individual rod coils with the axes of said coils in approximate alignment with the longitudinal axis of said housing, and retainer means including said movable gate for axially containing said coils prior to operation of said coil carrier means.

4. The apparatus as set forth in claim 3 wherein said loading surface is comprised of a movable coil conveyor, said coil conveyor extending from a remotely positioned coil loading station through said housing at said coil receiving station, the longitudinal axis of said conveyor positioned transversally to the longitudinal axis of said housing, a plurality of coil receiving flights on said conveyor, each said flight being adapted to carry a plurality of individual rod coils in approximate axial alignment thereon, said conveyor being further provided with spaced upwardly disposed conveyor side fences for axially containing the coils carried on said flight, said retainer means being in alignment with said conveyor side fences to provide a continuation thereof at said coil receiving station.

5. The apparatus as set forth in claim 4 wherein said retainer means is comprised of a movable gate and a tilting fence extending upwardly from opposite sides of said coil conveyor at said coil receiving station, said movable gate being mounted for movement along the longitudinal axis of said housing under the influence of said coil carrier means from a position aligned with one side fence of said conveyor to a position adjacent said compacting station, said tilting fence being pivotally mounted for movement from an upwardly disposed position in alignment with the other side fence of said conveyor to a remote downwardly disposed position.

6. In a rolling mill, coil handling apparatus for compacting and strapping a plurality of individual rod coils into unitized bundles having uniform dimensional characteristics comprising the combination of: a housing including a coil receiving station and a compacting and strapping station; said housing provided with a basic frame structure comprising two longitudinal supporting members extending horizontally above the mill floor in spaced parallel relationship; said coil receiving station provided with coil receiving means for loosely containing a plurality of individual rod coils in approximate axial alignment, said coil receiving means including a coil conveyor leading from a remote coil loading station and positioned transversally to the longitudinal axis of said housing, a plurality of coil receiving flights on said conveyor, each said flight being adapted to carry a plurality of individual rod coils in approximate axial alignment thereon, said coil conveyor further provided with opposed side fences for axially containing said coils thereon during movement from said loading station to said coil receiving station; retaining means forming extensions of said conveyor side fences to axially contain said individual rod coils at said coil receiving station, said retaining means comprising a rear gate providing a first compacting face, and a tilting fence, said rear gate movable along the longitudinal axis of said housing from a withdrawn position aligned with one of said conveyor side fences to an advanced position adjacent the compacting station, said tilting fence pivotally mounted for movement from an upwardly disposed position in alignment with said other conveyor side fence to a downward position remotely disposed from the travel of said rear gate; coil carrier means movable on said housing between said coil receiving station and said compacting and strapping station, said carrier means engaging said rear gate when moving towards said compacting and strapping station in order to cooperate therewith in collecting and carrying said axially aligned coils from said coil receiving station to said compacting and strapping station; compacting means including a second compacting face at said compacting and strapping station; interlocking means associated with said compacting means and said coil carrier means for placing said coil carrier means carrying said individual axially aligned coils in cooperative engagement with said compacting means, said compacting means cooperating with said carrier means and said rear gate to axially compact said individual coils between said first and second compacting faces by placing a portion of said carrier means in tension; strapping means for strapping said compacted coils into a unitized bundle having uniform dimensional characteristics; and bundle clearing means for removing said bundle from said carrier means following the completion of the bundle strapping operation.

7. The apparatus as set forth in claim 6 wherein said carrier means is comprised of a generally C-shaped member having upper and lower portions extending horizontally from an intermediate section, said upper portion having wheels rotatably mounted thereon to form a carriage assembly, said carriage assembly movable on spaced parallel track members fixed to said longitudinal supporting members, said lower portion comprising an elongated ram suitably designed for axial insertion through the individual axially aligned rod coils collected at said coil receiving station when said carrier means is displaced along said tracks from said coil receiving station towards said compacting and strapping station.

8. The apparatus as set forth in claim 7 wherein said compacting means is comprised of a compacting cylinder support positioned beneath said longitudinal supporting members at said compacting and strapping station, said support having compacting cylinders associated therewith, said compacting cylinders containing extensible pistons having a movable compacting gate attached thereto.

9. The apparatus as set forth in claim 8 wherein said interlocking means is comprised of indexing notches on said ram, an axial passageway extending through said compacting gate and said compacting cylinder support for receiving said ram in axial insertion therein, ram grips associated with said compacting cylinder support for operation within said passageway, said grips operable to engage said indexing notches on said ram when said ram is inserted within said passageway during movement of said carrier means from said receiving station to said compacting and strapping station, and means for pivoting said ram grips from a position in engagement with said notches to a release position in order to permit withdrawal of said ram from said passageway following the compacting and strapping operation.

10. In a rolling mill, rod coil handling apparatus for automatically compacting and strapping a plurality of individual rod coils into unitized bundles of uniform dimensional characteristics comprising: a housing including a coil receiving station and a compacting and strapping station, said stations connected by horizontally disposed longitudinal supporting members extending above the mill floor in spaced parallel relationship; said coil receiving station having a substantially horizontal loading surface with spaced opposed retaining means extending vertically on either side thereof in order to axially contain coils positioned therebetween on said loading surface, said retaining means comprising a rear gate and a tilting fence, said rear gate movable along said housing from a withdrawn position at one side of said loading surface to an advanced position adjacent the compacting and strapping station, said tilting fence pivotally mounted for movement from an upwardly disposed position at the other side of said loading surface to a downwardly disposed position in order to avoid interference with the movement of said rear gate; coil carrier means movable on said housing between said coil receiving station and said compacting and strapping station, said carrier means comprising a generally C-shaped member having upper and lower parallel horizontal extensions, said upper extension having wheels rotatably mounted thereon to form a carriage assembly, said carriage assembly mounted on track members attached to said longitudinal supporting members to extend between said coil receiving station and said compacting and strapping station, said lower extension comprising a ram suitably positioned for axial insertion through the coils positioned at said coil receiving station, said carrier means engaging said rear gate as said ram is inserted through the coils at the receiving station in order to cooperate therewith in collecting and carrying said coils from said coil receiving station to said compacting and strapping station; compacting means at said compacting and strapping station, said compactig means comprised of a compacting cylinder support positioned beneath said longitudinal supporting members at said compacting and strapping station, said support having horizontally disposed compacting cylinders mounted thereon, said compacting cylinders having pistons slidably mounted therein for extension towards said coil receiving station, said pistons having a compacting gate attached thereto, interlocking means associated with said coil compacting means and said coil carrier means for placing said coil carrier means carrying said individual coils in cooperative engagement with said coil compacting means, said interlockng means comprised of indexing notches on said ram, an axial passageway extending through said compacting gate and said compacting cylinder support for receiving said ram in axial insertion therein, and ram gripping means pivotally mounted on said compacting cylinder support for operation within said passageway, said gripping means adapted to cooperate with said indexing notches on said ram when said ram is inserted within said passageway with said individual coils tightly positioned between said rear gate and said compacting gate, said compacting cylinders operable to advance said compacting gate towards said rear gate in order to axially compact said coils positioned therebetween, strapping means for strapping said compacted coils into a single unitized bundle, and means for operating said ram gripping means from a position in engagement with said indexing notches to a released position in order to permit withdrawal of said ram from said passageway following the compacting and strapping operation; and bundle clearing means for removing said bundle from said carrier means following the completion of said strapping operation.

11. The apparatus as set forth in claim 10 wherein said strapping means is comprised of two automatic strapping machines mounted on either side of said compacting gate for movement therewith during the compacting cycle, said strapping machines capable of extending a predetermined length of retaining strap, strap guiding means for guiding said retaining strap at 180° intervals around said compacted coils in order to return the leading ends of said retaining strap to said strapping machines, said strapping machines being capable of tightening, fastening and cutting said retaining straps in order to combine said individual coils into a tightly compacted bundle.

12. The apparatus as set forth in claim 10 wherein said bundle clearing means is comprised of a coil elevator positioned beneath the compacting and strapping station, means for raising said elevator from a depressed position to a raised position in contact with the bundle depending from said ram following the completion of the compacting and strapping cycle, said bundle being raised when engaged by said elevator to a point out of contact with said ram in order to permit withdrawal of said ram therefrom, and means for laterally discharging said bundle from said coil handling apparatus as said elevator is lowered to its fully depressed position.

13. In a rolling mill, rod coil handling apparatus for automatically compacting and strapping a plurality of individual rod coils into unitized bundles of uniform dimensional characteristics comprising the combination of: a housing having a coil receiving station and a compacting and strapping station, said stations connected by supporting members extending above the mill floor in spaced parallel relationship; said coil receiving station provided with coil receiving means for loosely containing and axially aligning a plurality of individual coils, means for delivering a plurality of said coils to said coil receiving means; retaining means at said coil receiving station for axially containing said individual coils, said retaining means comprising a rear gate and a tilting fence, said rear gate movable along the longitudinal axis of said housing between a withdrawn position at said coil receiving station and advanced position adjacent said compacting and strapping station, said tilting fence pivotally mounted for movement from an upwardly disposed position in opposed spaced relationship to said rear gate when in said withdrawn position to a downwardly disposed position in order to avoid interference with the movement of said rear gate; coil carrier means movable on said housing between said coil receiving station and said compacting and strapping station, said coil carrier means comprising a generally C-shaped member having upper and lower parallel extensions, said upper extension having wheels rotatably mounted thereon to form a carriage, said carriage mounted on tracks attached to said longitudinal supporting members and extending between said coil receiving station and said compacting and strapping station, said lower extension comprising a ram suitably positioned for axial insertion through the coils positioned at said coil receiving station, said carrier means designed to engage said rear gate as said ram is inserted through said coils at the coil receiving station in order to cooperate therewith in collecting and carrying said coils from said coil receiving station to said compacting and strapping station; compacting means at said compacting and strapping station; interlocking means associated with said coil compacting means and said ram for placing said coil carrier means carrying said individual axially aligned coils in cooperative locked engagement with said coil compacting means, said compacting means cooperating with said ram and said rear gate to axially compact said individual coils by placing said ram in tension; strapping means for strapping said compacted coils into a unitized bundle of predetermined axial length, said strapping means comprised of two automatic strapping machines positioned on either side of said compacting means, said strapping machines capable of extending a predetermined length of retaining strap, strap guiding means for guiding said retaining strap at 180° intervals around said compacted coils in order to return the leading ends of said retaining straps to said strapping machines, said strapping machines capable of tightening, fastening, and cutting said retaining straps; and bundle clearing means for removing said bundle from said carrier means following the completion of said strapping operation, said bundle clearing means comprised of a coil elevator positioned beneath the compacting and strapping station, means for raising said elevator from a depressed position to a raised position in contact with the bundle depending from said ram following the completion of the compacting and strapping cycle, said bundle lifted to a point out of contact with said ram when said elevator is raised to its maximum elevation in order to permit withdrawal of said ram therefrom, and means for laterally discharging said bundle from said coil handling apparatus as said elevator is lowered to its fully depressed position.

14. The apparatus as set forth in claim 13 wherein said coil elevator is further provided with bundle rotating means, said rotating means comprising parallel bundle engaging rollers aligned with the longitudinal axis of the compacting and strapping apparatus and suitably journalled for rotation on the upper surface of the coil elevator, said rollers driven through a common drive means and positioned to engage said bundle as said elevator is raised, whereby rotation of said rollers following elevation of said elevator and bundle and the completion of one strapping cycle will result in rotation of said bundle about its longitudinal axis, thereby enabling the elevator to be subsequently lowered, the compacting mechanism reactuated and the strapping machine recycled in order to position retaining straps on said bundle at intervals of less than 180°.

References Cited

UNITED STATES PATENTS

| | | | |
|---|---|---|---|
| 2,674,181 | 4/1954 | Jones | 100—12 |
| 2,926,598 | 3/1960 | Dentzer | 100—3 X |
| 2,930,313 | 3/1960 | Bocher | 100—3 |
| 3,118,367 | 1/1964 | Lindholm | 100—4 |
| 3,129,658 | 4/1964 | Valente | 100—12 X |
| 3,195,444 | 7/1965 | McLean | 100—12 X |
| 3,212,429 | 10/1965 | Fay | 100—12 X |

CHARLES W. LANHAM, *Primary Examiner.*

A. RUDERMAN, *Assistant Examiner.*